(12) United States Patent
Schroeder et al.

(10) Patent No.: US 12,491,900 B1
(45) Date of Patent: Dec. 9, 2025

(54) IMPAIRED DRIVER WARNING AND AVOIDANCE SYSTEM

(71) Applicant: UIPCO, LLC, San Antonio, TX (US)

(72) Inventors: Eric David Schroeder, San Antonio, TX (US); Donnette L Moncrief Brown, San Antonio, TX (US); Snehal Desai, Richardson, TX (US); Manfred Amann, San Antonio, TX (US); Timothy Frank Davison, San Antonio, TX (US); Rachel Michelle Ballew, San Antonio, TX (US); Kelsey Anne O'Brien, Austin, TX (US); Sayeef Rahim, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 188 days.

(21) Appl. No.: 18/324,352

(22) Filed: May 26, 2023

Related U.S. Application Data

(60) Provisional application No. 63/365,437, filed on May 27, 2022.

(51) Int. Cl.
*B60W 50/14* (2020.01)
*B60W 30/09* (2012.01)
(Continued)

(52) U.S. Cl.
CPC ............ *B60W 50/14* (2013.01); *B60W 30/09* (2013.01); *B60W 30/0956* (2013.01); *G06V 20/58* (2022.01); *G08G 1/164* (2013.01); *G08G 1/166* (2013.01); *B60W 2050/143* (2013.01); *B60W 2050/146* (2013.01); *B60W 2420/403* (2013.01); *B60W 2554/4046* (2020.02); *B60W 2554/4047* (2020.02)

(58) Field of Classification Search
CPC .. B60W 50/14; B60W 30/09; B60W 30/0956; B60W 2050/143; B60W 2050/146; B60W 2420/403; B60W 2554/4046; B60W 2554/4047; G06V 20/58; G08G 1/164; G08G 1/166
USPC ...................................... 340/425.5
See application file for complete search history.

(56) References Cited

U.S. PATENT DOCUMENTS

| 10,166,994 B1 * | 1/2019 | Fields ................. B60K 35/00 |
| 2002/0198632 A1 * | 12/2002 | Breed ................. G01S 17/86 |
| | | 701/472 |

(Continued)

*Primary Examiner* — Omar Casillashernandez
(74) *Attorney, Agent, or Firm* — Plumsea Law Group, LLC

(57) ABSTRACT

Methods and systems for detecting and responding to impaired drivers are disclosed. The methods intelligently alert and route a user driver's vehicle to improve driving safety based on a predicted path of an impaired driver. The method shares data collected by vehicles in an area to determine which that a vehicle has an impaired driver. The method associates cones of certainty with such a vehicle to establish where the vehicle is likely to travel in the future. If the system determines there is a likelihood of accident based on a proximity to these cones of certainty, an alert can be presented to a user driver of a proximate vehicle. The method also generates routes that avoid or limit the user driver's exposure to the impaired driver's vehicle, such as by suggesting detours or automatically controlling the user driver's vehicle to avoid the path of the impaired driver.

16 Claims, 10 Drawing Sheets

(51) Int. Cl.
*B60W 30/095* (2012.01)
*G06V 20/58* (2022.01)
*G08G 1/16* (2006.01)

(56) References Cited

U.S. PATENT DOCUMENTS

| | | | |
|---|---|---|---|
| 2010/0253539 A1* | 10/2010 | Seder | G01C 21/365 |
| | | | 340/902 |
| 2010/0295707 A1* | 11/2010 | Bennie | B60W 40/09 |
| | | | 340/439 |
| 2016/0003636 A1* | 1/2016 | Ng-Thow-Hing | G01C 21/365 |
| | | | 701/418 |
| 2016/0314674 A1* | 10/2016 | He | G06F 1/163 |
| 2016/0347309 A1* | 12/2016 | Vijayan | G08G 1/166 |
| 2017/0243485 A1* | 8/2017 | Rubin | H04W 4/46 |
| 2018/0037228 A1* | 2/2018 | Biondo | A61B 5/4845 |
| 2022/0144296 A1* | 5/2022 | Seitz | B60K 35/85 |
| 2024/0386799 A1* | 11/2024 | Harrison | G08G 1/096775 |

\* cited by examiner

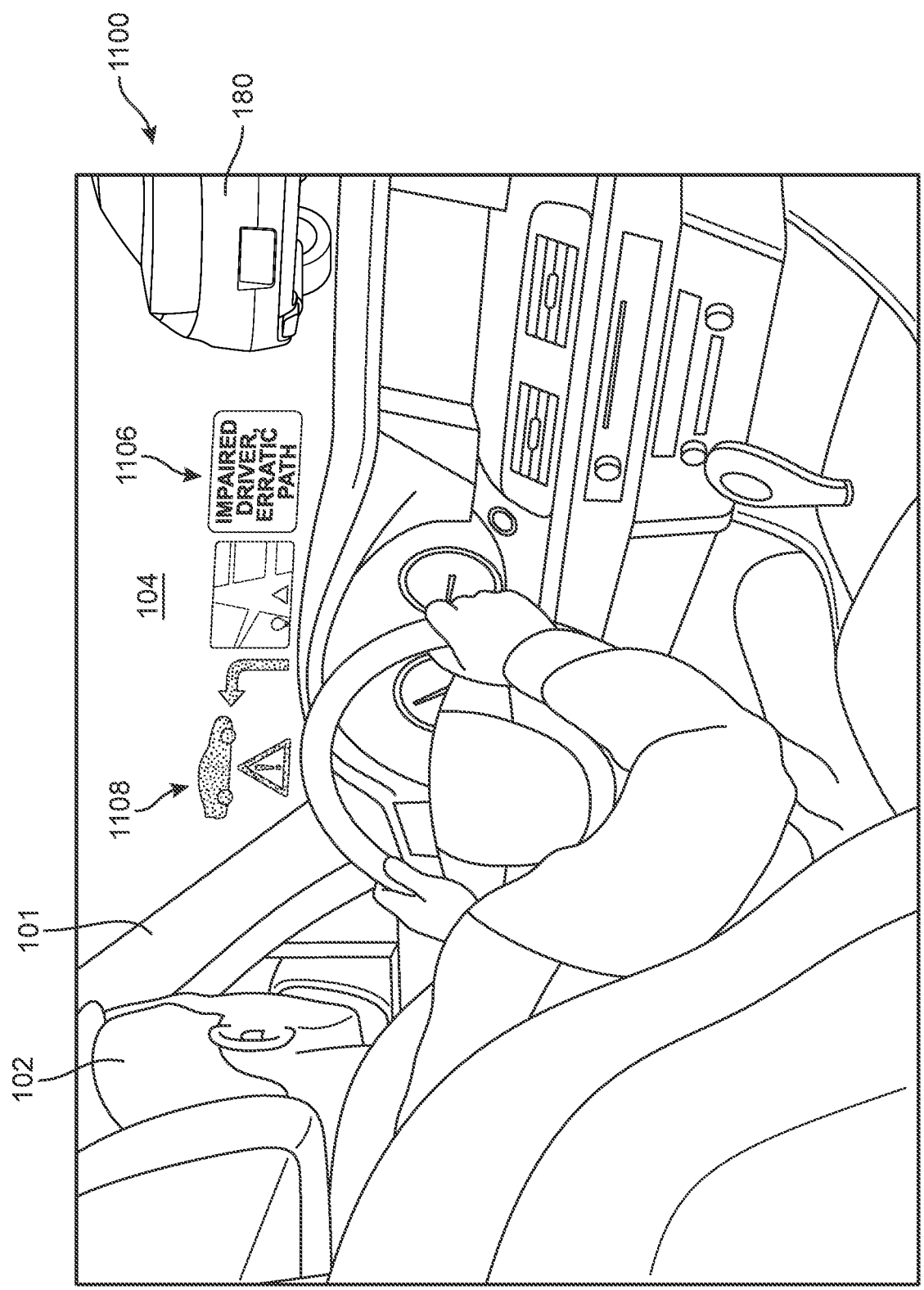

IMPAIRED DRIVER WARNING AND AVOIDANCE SYSTEM

CROSS-REFERENCE TO RELATED APPLICATIONS

This application claims the benefit of U.S. Provisional Patent Application Ser. No. 63/365,437 filed on May 27, 2022 and titled "Impaired Driver Warning and Avoidance System." The disclosure of which is incorporated by reference in its entirety.

TECHNICAL FIELD

The present disclosure generally relates to detecting and responding to impaired drivers. The present disclosure specifically relates to methods and systems for crowdsourcing gathering of information to analyze characteristics of vehicles' motion and other information to infer when vehicles are being operated by impaired drivers. The methods and systems cause user vehicles to respond appropriately to improve driving safety.

BACKGROUND

Defensive driving skills help drivers reduce the risk of collisions. Such skills involve anticipating dangerous situations that may occur while driving. Such dangerous situations may occur even when the driver operates the vehicle in a technically sound manner. One aspect of defensive driving may include ensuring that the driver has adequate warning of impaired drivers on the road. In particular, impaired drivers can change position in a way that can present difficulties to another driver's ability to respond in a thoughtful and safe manner. Such impaired drivers may behave in unexpected and reckless ways that present dangers to other drivers. It may be possible to provide information about these impaired drivers and how the impaired drivers may be most likely to behave to another driver. Providing such information can significantly reduce the likelihood of accidents and damage to persons and property. Currently, vehicle alert systems offer only basic information about conditions directly associated with the vehicle's current location. Conventional alerts fail to convey warnings or otherwise help in responding to impaired drivers that may threaten nearby drivers. Also, conventional alerts fail to gather information from other drivers in an area that may be used to infer the dangerous behavior of impaired drivers. Such information could potentially advise endangered vehicles of dangerous circumstances.

There is a need in the art for a system and method that addresses the shortcomings discussed above.

SUMMARY

In one aspect, a method of providing an alert to a driver of a first vehicle includes receiving information about a second vehicle from at least one sensor of the first vehicle. The method further includes determining, based on the information, that a driver of the second vehicle is an impaired driver. The method also includes determining, based on the information, a predicted path of the second vehicle. The method further includes determining, based on the predicted path of the second vehicle, a likelihood of a vehicle intersection event occurring between the first vehicle and the second vehicle. The method also includes causing the alert to be presented to the driver of the first vehicle, the alert comprising information about the predicted path of the second vehicle and the likelihood of the vehicle intersection event.

In another aspect, a method of providing a driving route to a driver of a first vehicle includes receiving information about a second vehicle from at least one sensor of the first vehicle. The method further includes determining, based on the information, that a driver of the second vehicle is an impaired driver. The method also includes determining, based on the information, a predicted path of the second vehicle. The method further includes receiving a current location and a current route of the first vehicle. The method also includes determining, based on the current location and the current route of the first vehicle and the predicted path of the second vehicle, a likelihood of a vehicle intersection event occurring between the first vehicle and the second vehicle at a hazardous location. The method further includes causing an alert to be presented to the driver of the first vehicle, the alert being based on the likelihood of the vehicle intersection event and containing information about a modified route that starts at the current location of the first vehicle and causes the first vehicle to avoid the hazardous location.

In another aspect, a method of changing a driving route for a first vehicle includes receiving information about the motion of a second vehicle from at least one sensor of the first vehicle. The method further includes determining, based on the information, that a driver of the second vehicle is an impaired driver. The method also includes determining, based on the information, a predicted path of the second vehicle. The method further includes receiving a current location and a current route of the first vehicle. The method also includes determining, based at least on the current location and the current route of the first vehicle and the predicted path of the second vehicle, that there is a high likelihood of a vehicle intersection event occurring between the first vehicle and the second vehicle at a hazardous location. The method further includes automatically performing, in response to the determination of the high likelihood of the vehicle intersection event occurring, at least one driving action by the first vehicle to cause the first vehicle to avoid the hazardous location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 11 is an example of an interior view of a motor vehicle showing how information about an impaired driver may be provided to a driver of the motor vehicle.

DETAILED DESCRIPTION

The embodiments provide methods and systems to improve driving safety. Specifically, the embodiments provide methods and systems for taking various actions to safeguard a user driver's vehicle when a system detects that a driver in another vehicle may be impaired. Here, a "user driver" refers to a driver of a vehicle that may be in a same area as the impaired driver's vehicle. An "impaired driver" refers to a driver with some form of impairment. An object of the methods and systems may be to help a user driver drive in a manner that minimizes danger from interactions with the impaired driver.

The following discussion refers to a vehicle driven by the user driver as "a user driver's vehicle." The discussion specifies how the information about the "impaired driver's vehicle" can be used to preserve the safety of the user driver by governing the operation of the user driver's vehicle. The discussion presented below pertains to a scenario in which the user driver's vehicle has a user driver as the passenger who may be protected. The user driver's vehicle may also carry one or more passengers, such as a front driver's side passenger or rear seat passengers. The user driver's vehicle may also carry valuable cargo. For example, valuable luggage may be carried in a trunk. Preserving the safety of the user driver's vehicle may consider protecting the safety of passengers, the safety of cargo, and the well-being of the user driver.

An aspect of the methods and systems may be to provide information to the user driver of the user driver's vehicle that the impaired driver's vehicle may be nearby. The methods and systems may give the user driver information that allows the user driver to safely respond to the impaired driver's actions. Such a response may avoid an accident. Embodiments may also aid in sharing information between various user drivers. Information sharing may help coordinate safe reactions to the erratic driving of an impaired driver. For example, other drivers present near the user driver and the impaired driver may gather information about the driving of the impaired driver. Other drivers may do so using certain sensors, such as cameras. The other drivers may share the information with the user driver. Then, the user driver's vehicle can process the information. The user driver's vehicle can then share the results of such information with the user driver. Alternatively, the user driver's vehicle can take automatic actions that minimize the danger presented by the impaired driver to the user driver.

Figure 1:
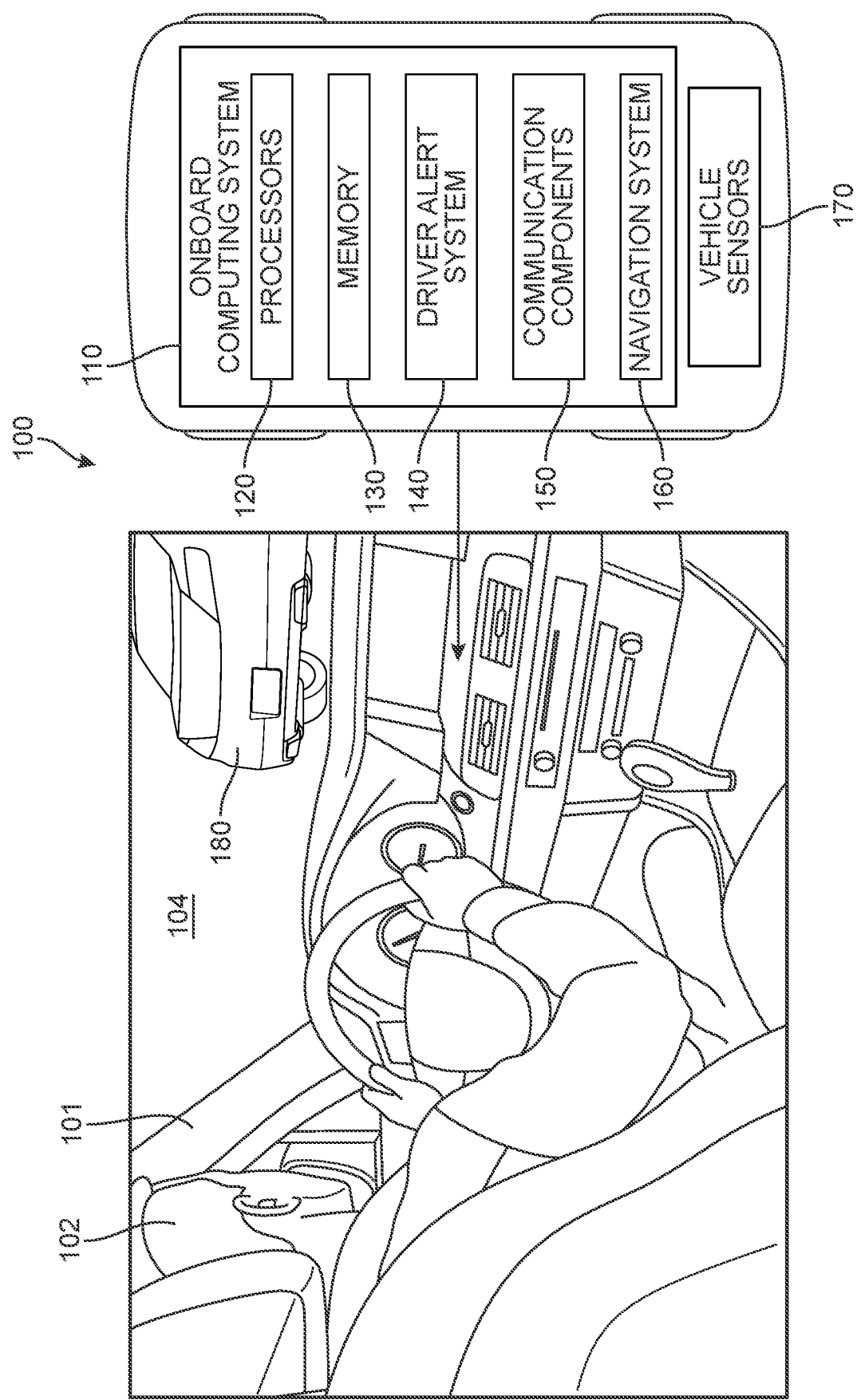
FIG. 1 is an example of an interior view of a motor vehicle located behind a vehicle of an impaired driver, alongside a schematic of a vehicle computing system, according to an embodiment.

FIG. 1 is an example of an interior view 100 of a user driver's motor vehicle 101 ("user vehicle") located behind a vehicle of an impaired driver ("impaired driver's vehicle") 180, alongside a schematic of a vehicle computing system, according to an embodiment. In the following discussion, user vehicle 101 corresponds to a user driver's vehicle. A goal of embodiments may be to provide user vehicle 101 with the capability to identify the impaired driver's vehicle 180 as having an impaired driver. Embodiments also provide user vehicle 101 with information about the movements of impaired driver's vehicle 180. By using such information, user vehicle 101 may react accordingly and ensure that user vehicle 101 may be safe.

Referring now to FIG. 1, FIG. 1 presents a view 100 of an interior of one embodiment of a user vehicle 101. The user vehicle 101 may include an onboard computing system 110. Onboard computing system 110 may include a single computing device, or a network of multiple computing devices. For example, onboard computing system 110 may be associated with one or more electronic control units (ECUs). An electronic control unit (ECU) is also known as an electronic control module (ECM). Such an ECU may be an embedded system in an automobile. It may include automotive electronics that control one or more of the electrical systems or subsystems in a car or other motor vehicle.

For purposes of illustration, the interior of the user vehicle 101 in FIG. 1 includes a user driver 102 seated in the driver's seat of the user vehicle 101. FIG. 1 also shows, in the field of view of user driver 102, a windshield area 104. Windshield area 104 presents a view of the road ahead. In some embodiments, the windshield area 104 may be used to provide a head-up display. A head-up display refers to a system in which information may be projected. For example, the information may be projected upon a visor, a screen between the user driver 102 and a windshield area 104, or directly upon the windshield area 104. Additional aspects of the head-up display are shown and discussed with respect to FIG. 11, below.

As seen in FIG. 1, onboard computing system 110 includes one or more processors 120 and memory 130. Memory 130 may include a non-transitory computer readable medium. Instructions stored within memory 130 may be executed by the one or more processors 120. Such executed instructions allow the onboard computing system 110 to perform the methods described to detect vehicle information associated with impaired drivers. The methods also allow appropriate reactive steps by the user vehicle 101.

For clarity, some of the vehicle systems of the embodiments are depicted as residing within a single onboard computing system 110. However, it may be appreciated that in some embodiments, one or more of these systems could be separate. That is, the systems may not comprise part of a single computing system. Instead, two or more systems could each comprise their own processors 120. The two or more systems could also each comprise their own memory 130. The multiple systems could also include components facilitating communication with other systems. User vehicle 101 may also include one or more communication components 150. Communication components 150 may include cellular network components for communicating over cellular networks, Wi-Fi components for communicating over Wi-Fi networks, and other communication components. However, the networks accessed by communication components 150 may not be limited to Wi-Fi networks and cellular networks. Other wired or wireless technologies may allow onboard computing system 110 to send and receive data from other vehicles in the vicinity of user vehicle 101.

User vehicle 101 may also include a navigation system 160. In some cases, navigation system 160 includes a Global Positioning System (GPS) receiver that can receive GPS information. In other cases, navigation system 160 can include other receivers capable of receiving global or local positioning information. Additionally, navigation system 160 may include maps or other information from other kinds of geographic information systems (GIS) that can be used to generate navigation routes for a user driver.

Such navigation for a user driver may be relevant for avoiding accidents. It may be helpful to use a navigation system 160 that may be aware of the user driver's intended route. By using such a navigation system 160 it becomes possible to suggest alternative directions. It also becomes possible to determine when it may be helpful to override control of the user vehicle 101 for user driver safety. For example, the navigation system 160 may be used to help determine alternative routes when suggesting how to avoid impaired driver's vehicle 180. The navigation system 160 may also take over actual control of the user vehicle 101 when deemed helpful to avoid an accident.

Figure 5:
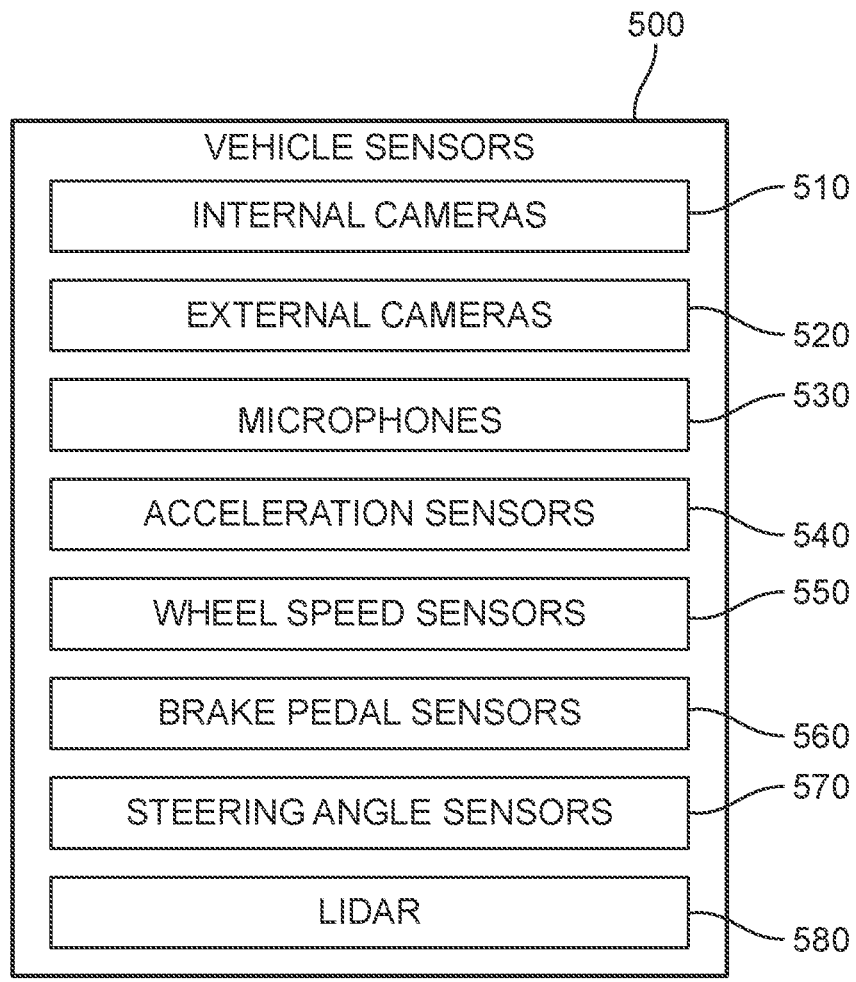
FIG. 5 is a schematic view of a set of vehicle sensors, according to an embodiment.

User vehicle 101 may also include one or more vehicle sensors 170, which may correspond to vehicle sensors 500 of individual vehicles as shown in FIG. 5. User vehicle 101 may also include an onboard diagnostics (OBD) system. Such an OBD system may operate in conjunction with processors 120 and memory 130. An OBD system may track and process various vehicle sensor information. In some cases, one or more systems of user vehicle 101 could retrieve sensory data from the OBD system rather than directly from the vehicle sensors 170 themselves.

Figure 4:
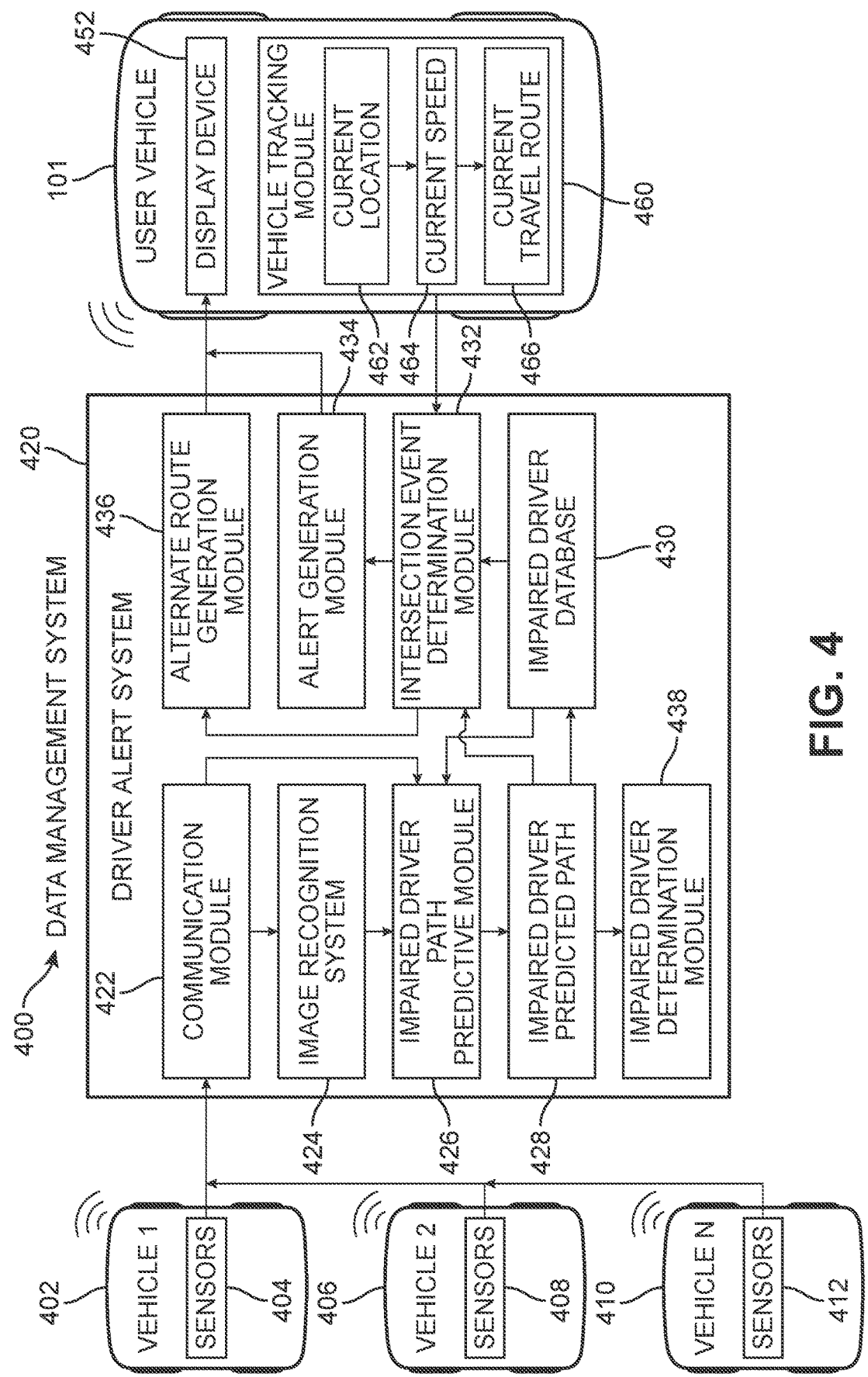
FIG. 4 is a schematic diagram of a driver alerts system being implemented as part of a shared data management system, according to an embodiment.

In different embodiments, the onboard computing system 110 of user vehicle 101 may be configured to communicate with one or more remote systems over a network, such as by using communication components 150. Additional aspects of such communication are shown in FIG. 4. The network could comprise any wide area network, local area network or other suitable network. In some cases, the network may be the Internet. The onboard computing system 110 may communicate, for example, with one or more external database systems.

An external database system can include a server (including processors and memory) and a database or another data storage repository. The external database system may store various kinds of information, including, but not limited to: navigation information, geospatial information, road conditions (for example, real-time traffic patterns), weather information (including, for example, rain, snow, ice, flooding forecasts, and so on), and other kinds of information. Onboard computing system 110 may both send and receive information to and from these remote databases. It may also be appreciated that in other embodiments, one or more of these databases (or parts of the databases) could be locally disposed within user vehicle 101. Such information may assist in the direction of user vehicle 101.

As seen in FIG. 1, the user vehicle 101 further includes a driver alert system 140. Driver alert system 140 may be configured to provide indications and other information about the impaired drivers and their expected paths. Such information may be provided to the user vehicle 101 or other motor vehicles traveling on the roadways. The provision of such information is described in further detail below and shown schematically in FIG. 4. Additional aspects of the operation of driver alert system 140 are presented in the discussion of FIG. 11. In general, driver alert system 140 provides visual, auditory, or other sensory feedback that an impaired driver may be associated with an impaired driver's vehicle 180. Driver alert system 140 may provide additional information about the impaired driver's vehicle 180, such as its expected path.

Figure 2:
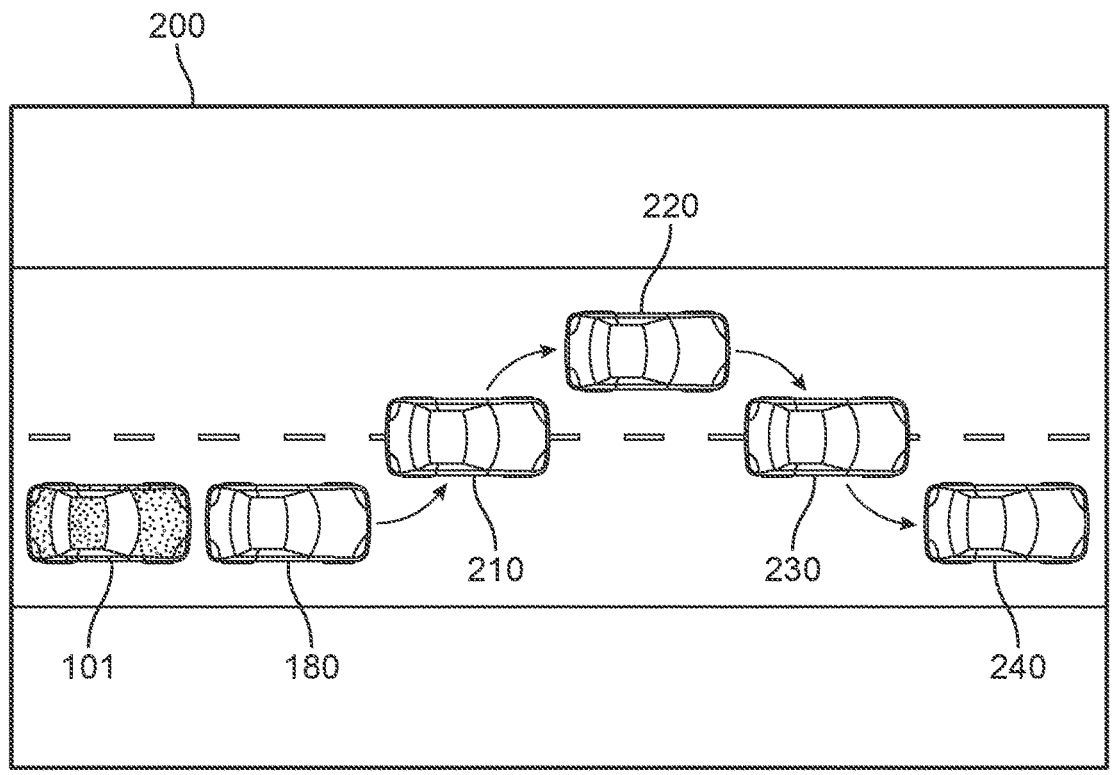
FIG. 2 is a schematic view of a scenario where a first vehicle may observe an impaired driver who fails to drive in a straight line, according to an embodiment.

FIG. 2 is a schematic view 200 of a scenario where a user vehicle 101 may observe an impaired driver's vehicle 180 that fails to drive in a straight line, according to an embodiment. For example, FIG. 2 shows an overhead view of a highway. In the overhead view, user vehicle 101 travels behind impaired driver's vehicle 180. As impaired driver's vehicle 180 travels along the highway, it takes on positions 220, 230, and 240. As illustrated in FIG. 2, the impaired driver's vehicle 180 may weave in its lane or may cross over a median. The impaired driver's vehicle 180 may even weave into a neighboring lane or into a lane in a way that would result in possible head-on collisions with oncoming traffic. Thus, such driving by an impaired driver may be quite unsafe. The impaired driver may drive in a way that may be unpredictable. The impaired driver may also drive into areas where the impaired driver may not be supposed to drive, such as a wrong lane. Accordingly, in FIG. 2, the impaired driver's vehicle's motion may be indicative of an impaired driver.

FIG. 2 may be one example of driving by an impaired driver. Impairment may lead to erratic driving in several ways. For example, the impaired driver may lack sufficient attention to be able to avoid accidents. Alternatively, if an impaired driver is angry or aggressive, he or she may actively and knowingly drive in a manner that he or she knows to be dangerous. If an impaired driver is distracted, the impaired driver may not be able to react properly when he or she is proximate to other cars. An impaired driver may also drive in a way in which a user driver 102 may be forced to drive unsafely to avoid an accident. Such driving may create a ripple effect as an impaired driver forces a user driver 102 to create an unsafe situation. The impaired driver forces the user driver 102 to drive the user vehicle 101 unsafely to avoid the path of the impaired driver's vehicle 180.

Figure 3:
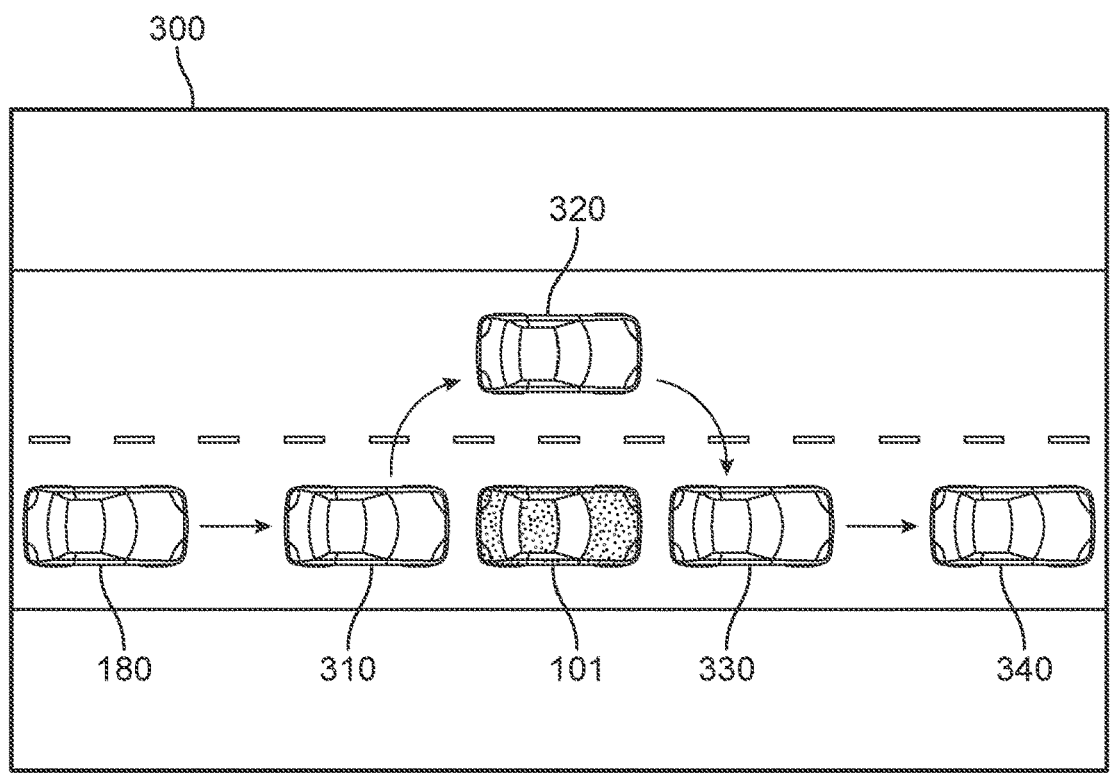
FIG. 3 is a schematic view of a scenario where a first vehicle may observe an impaired driver who drives past the first vehicle at an excessive speed, according to an embodiment.

FIG. 3 is a schematic view 300 of a scenario where a user vehicle 101 may observe an impaired driver who drives at an excessive speed, according to an embodiment. For example, FIG. 3 shows that vehicle 100 travels behind impaired driver's vehicle 180. As impaired driver's vehicle 180 travels along the highway, impaired driver's vehicle 180 takes on position 310. FIG. 3 shows that impaired driver's vehicle 180 travels from its original position to position 310 very quickly. For example, the speed limit along the illustrated portion of the highway may be 45 miles per hour. The impaired driver's vehicle 180 may be traveling 75 miles per hour, significantly in excess of the limit.

An impaired driver's impaired driving may manifest itself through unusual speeds in different ways. In general, drivers may safely drive close to the speed limit on a given road, with a moderate amount of deviation. For example, if the speed limit on a given road is 45 miles per hour, driving at 40 to 50 miles per hour may be appropriate. A safe speed may also depend on which lane a driver drives in. However, driving at 15 miles per hour in an area where most traffic travels at 45 miles per hour may be dangerous since it is significantly slower than the rest of traffic. In general, an appropriate speed may be one at which the driver may be driving at a similar speed as surrounding traffic. Thus, travelling too fast or slow may each be a sign of impaired driving.

Thus, FIGS. 2-3 show certain aspects of examples of an impaired driver based on how the impaired driver drives impaired driver's vehicle 180. In various embodiments, when a driver of a vehicle may be impaired, the driver may drive his or her vehicle in a way that poses a danger to nearby vehicles. The system could use various sources of information to detect impaired drivers. Such sources could include using a crowdsourced group of vehicles in an area. The vehicles could monitor the behavior of the impaired vehicle visually. Such monitoring could occur by using machine vision to analyze still images or video of the motion of the impaired vehicle. However, the group of vehicles can also use other sensors to gather information about potentially impaired vehicles. The system can also receive camera and other sensor information from other sources. For example, the group of vehicles can send and receive messages from nearby vehicles that have tagged the driver as impaired. Such messages may also include information about observations about how the impaired driver's vehicle 180 moves. The messages could also include other information about how to predict the further movement of impaired driver's vehicle 180.

Some embodiments may include provisions for detecting impaired drivers. In some embodiments, the detecting of impaired drivers may involve detecting the impaired driver by using vehicle movement information. Such driver movement information may pertain to aspects of the movement of vehicles that could potentially be classified as having an impaired driver. In some embodiments, the detecting of impaired drivers uses information from a vehicle that may currently be driven by a user and also uses information from other vehicles or traffic sensors in a geographic area.

In some embodiments, the detecting uses information from a currently driven vehicle. In some cases, the currently driven vehicle may use various sensors to provide the data used for the detecting. In some cases, these sensors may be built into the vehicle to gather information from the local environment pertaining to potential impaired drivers. In some embodiments, the currently driven vehicle includes cameras. In some cases, these cameras may be inside the vehicle and in other cases, these cameras may be outside of the vehicle. These cameras may capture images and those images may be analyzed, such as using machine vision, to determine positions of other vehicles in an area and how those positions change over time. In some embodiments, the currently driven vehicle may use other sensors to track motions of neighboring vehicles. In some cases, these sensors may include microphones and sensors such as light detection and ranging (LIDAR) or other sensors that establish movements of other vehicles in a region.

In some embodiments, the detecting may use information from other vehicles in a region. Such other vehicles may include vehicles that themselves may have an impaired driver and other vehicles in an area that may be able to provide information about other vehicles that may be driven by an impaired driver. In some embodiments, these vehicles may include sensors to help identify impaired drivers. In some cases, these sensors may include cameras, as discussed above. In some embodiments, the sensors may include sensors to track the movement of other vehicles. In some cases, the sensors may include sensors built into a given vehicle that provide the vehicle with a way to track its own movements that would suggest that a vehicle may be driven by an impaired driver. In some embodiments, vehicles may track their own movements with acceleration sensors, wheel speed sensors, brake pedal sensors, and steering angle sensors. In some embodiments, the determining may use information from a traffic network in an environment. In some cases, such information may include various sensors situated in the environment, situated to observe the traffic or integrated into traffic signals. In some cases, these sensors may be cameras that acquire images that may be processed to characterize the movement of drivers in a region. The sensors may also include other sensors such as light detection and ranging (LIDAR) or radio detection and ranging (RADAR) sensors that track the movement of vehicles in an area.

Once a method or system has established the identity of an impaired driver, the method or system may take one or more of the following actions. First, the method or system may predict the route of the impaired driver's vehicle 180. Such prediction may gather information about the current motion of impaired driver's vehicle 180. The prediction may use various models to infer where the impaired driver's vehicle 180 may be likely to be as it continues to move. The prediction may also provide a type of impairment to the model. Second, the method or system may automatically alter a Global Positioning System (GPS) route to avoid the predicted route. Such alteration may take at least two forms. In one form, the alteration provides an indication to a user driver 102 whose route creates the potential for danger. Such potential for danger is inferred based on an original planned route of the user driver 102. Such an indication may operate by changing the navigation that the GPS provides to the user driver 102, or may specifically provide another navigation suggestion that overrides the existing directions.

Another approach to altering a route of a user vehicle 101 may be to actually intervene with the operation of the user vehicle 101 automatically. For example, the method or system may send a signal to the vehicle that it may be helpful for the vehicle to automatically change its route. The signal may cause automatic steering, automatic braking, or automatic accelerating by the vehicle. Such vehicle actions may occur without human intervention. Accordingly, the user driver 102 may turn such automatic intervention on or off, based on a level of comfort with such automatic safety interventions.

Third, the user vehicle 101 may notify nearby vehicles of the impaired driver and the impaired driver's predicted route. Such notifying may also include notifying nearby vehicles of how the user vehicle 101 plans to respond to the driving of impaired driver's vehicle 180. Such notifying allows the nearby vehicles to take this information into account when planning their own driving. In some cases, the method or system can also tag the impaired driver's vehicle 180 using a head-up display. Such an approach lets the driver easily see the vehicle among other traffic. Additional aspects of such tagging are presented in conjunction with FIG. 11.

The methods and systems may be designed to automatically detect that a driver of a vehicle may be impaired. Such impairment means that the driver's ability to safely drive his or her vehicle may be compromised for some reason. For example, a common type of impairment that affects a driver of a vehicle may be alcohol intoxication. However, other types of impairment may be relevant. For example, impairment may occur due to other substances, such as marijuana. Drivers may take such substances illegally or legally. However, legally taken substances may still impair a driver. Examples of such legal substances include prescription or over-the-counter painkillers or sleep aids.

Impairment is not limited to driving under the influence of drugs, however. For example, if a driver is sleep-deprived, hungry, or dehydrated, such conditions may interfere with the driver's ability to drive safely. These conditions cause the driver to be an impaired driver. Alternatively, a driver may have a health condition that interferes with safe driving. Examples of such conditions include an epileptic seizure, a diabetic episode, a heart attack, or a stroke, as non-limiting examples. A driver may also be impaired if he or she is distracted. Example distractions include talking on a cell phone, conversing with a passenger, and so on.

In addition, a driver may be considered to be impaired if he or she is in an emotional state that interferences with calm, focused driving. For example, if a driver is angry or aggressive, this may impair driving. Alternatively, anxiety or distractibility may also be other non-limiting examples of emotions and mental states that prevent or interfere with safe driving and hence characterize an impaired driver. Such emotions may cause an impaired driver to have difficulty driving safely, rendering the driver impaired. Additionally, multiple forms of impairment may simultaneously affect how an impaired driver drives. For example, a driver may talk on a cell phone (thus being distracted) and simultaneously be intoxicated on sleep aids, making that driver even more dangerous to other vehicles.

Thus, such a state of impairment affects the way in which the impaired driver operates a vehicle. Impairment may lead to dangerous driving by the impaired driver. Such driving may be dangerous by being characterized as unpredictable, erratic, reckless, or aggressive. For example, an impaired driver may turn or change lanes suddenly or without warning. An impaired driver may also drive erratically, such as by weaving between multiple lanes. An impaired driver may also driver recklessly or aggressively by driving very quickly. As noted, driving at a safe speed generally includes driving at, slightly above, or slightly below a speed limit of a road.

Reckless driving may also include disobeying traffic signals. Such signals include traffic lights and traffic signs, such as stop, yield, merge, and so on. Reckless and aggressive driving may also include driving where the reckless driver does not behave safely with respect to other vehicles. Examples of such unsafe driving include braking unpredictably, or by leaving insufficient distance in front of the front of the reckless vehicle and the other vehicle (also known as "tailgating"). An impaired driver may not be reckless or aggressive, but may instead be distracted or confused. For these impairments, an impaired driver may manifest impairment by driving without paying sufficient attention to other cars, may drive at a very slow speed, or may suddenly try to change lanes or may make a turn with little warning.

However, these are only examples of how an impaired driver might manifest an impairment. The methods and systems may be able to detect various types of impairment. The methods and systems may consider the kind of impairment when estimating how the impaired driver may be expected to behave. As discussed further below, the methods and systems compare information from sensors from multiple vehicles in an area. Such information characterizes the motion of a vehicle and allows for use of such information to identify impaired drivers and predict their behavior. Trained models may allow different types of impaired driving to be associated with different types of impairment. The different types of impairment may cause the system to predict different behaviors by the impaired driver. For example, predicted behavior for an aggressive driver may differ from predicted behavior for an intoxicated driver. The model may suggest that an aggressive driver is likely to drive quickly, while an intoxicated driver may weave in a lane.

Other drivers beside the impaired driver desire to drive to avoid accidents with the impaired driver. Such accidents may include a vehicular collision with the impaired driver itself. Examples of collisions include a rear-end collision, a head-on collision, a T-bone collision, or a side-swipe collision. The behavior of the impaired driver may also lead to a single-vehicle accident by another vehicle. The behavior of the impaired driver may even lead to a collision between other vehicles. For example, an impaired driver may drive in a manner that forces another driver off of the road or into the path of yet another vehicle. If dangerous situations are identified quickly, it may be possible to identify appropriate reactions to the driving of the impaired driver. If a dangerous situation may be identified too late, other drivers may be forced to drive dangerously themselves to avoid an impaired driver.

Some embodiments may include provisions for detecting an impaired driver. In some embodiments, the detection may occur based on analyzing characteristics of a driver's driving. Such analysis may lead to a determination that a given driver may be an impaired driver. In some embodiments, the detection may be based on establishing that a given driver may be driving in a way that may be considered unusual. In some cases, the detection may be based on detecting driver behavior that has a dangerous character. A driver's driving may be compared to a standard for typical driving, and a deviation may imply that a drive may be impaired. In some embodiments, certain types of driving may indicate that a driver is impaired in certain specific ways. In some cases, unusual driving may indicate that a driver may be aggressive, distracted, or intoxicated. Unusual driving may include driving with an unusual speed and driving with unusual positioning and movement characteristics.

In some embodiment, a driver may be classified as an impaired driver because the driver drives a vehicle with an unusual speed. In some cases, the unusual speed may be unusually high, low, or erratic. Where the unusual speed is unusually high, the speed may exceed a set speed limit or may exceed a certain threshold above a speed limit. Similarly, where unusually speed is unusually low, the speed may be less than a set minimum speed or may be less than such a minimum speed by a threshold. In some embodiments, a driver may be characterized as being impaired due to having an erratic speed. If a driver changes speed unusually often, the driver may be characterized as erratic. In some embodiments, a model may establish typical acceleration and deceleration for vehicles in a traffic scenario and a driver may be impaired if that driver accelerates and decelerates more than a threshold in excess of such typical speed changes.

In some cases, an impaired driver may drive with unusual positioning and movement characteristics with respect to how the vehicle may be steered and driven. In some embodiments, such unusual movement characteristics may include unusual lane positioning, erratic movement, or driving that may be determined as likely to result in a collision or other accident. Unusual lane positioning may include various ways of failing to remain properly in a lane, such as traveling in an incorrect lane, unsafe lane chances, or failure to travel centered in the lane of travel. Erratic movement may include movement that deviates from an expected route that would be followed if a driver may be driving normally. Driving that may be likely to result in a collision or accident may be driving that, when analyzed and predicted, will likely cause a vehicle to collide with another vehicle or otherwise force a vehicle to get in an accident.

FIG. 4 is a schematic diagram of a driver alert system 420 being implemented as part of a shared data management system 400, according to an embodiment. FIG. 4 depicts an overview of an embodiment of a vehicle data management system 400 in which vehicles can share data and receive alerts. Vehicles can also share alternate route guidance. Such alerts and guidance may be responsive to the driving of an impaired driver via access to components of a driver alert system 420. In FIG. 4, a plurality of sensor-equipped vehicles (in this example, a Vehicle 1 402, Vehicle 2 406, and Vehicle N 410) may be transmitting, conveying, or otherwise providing to (and in some cases receiving data from) the driver alert system 420 or components or modules of the driver alert system 420.

These "data-generating vehicles" (Vehicle 1 402, Vehicle 2 406, and Vehicle N 410) may be configured to detect via a plurality of sensors (see FIGS. 1 and 5) that a given vehicle may potentially be an impaired driver's vehicle 180. The sensors may also provide characteristics of the driving of such a vehicle, and external road conditions such as other cars around the vehicle and weather. These are only examples of external road conditions. Other external road conditions may be relevant to tracking an impaired driver's vehicle 180. Such vehicles 402, 406, and 410 will generally be in transit and moving from one destination to another as the sensors collect data. However, the vehicles may be parked or otherwise not actively traveling along the roadways when the data may be collected.

In addition, a plurality of actively transiting vehicles (including, for example, user vehicle 101) can receive at least one signal to generate alerts and alternate route guidance via the driver alert system 420. Alternatively, such signals may be sent via components or modules of the driver alert system 420. As shown in FIG. 4, the driver alert system 420 includes a communication module 422 configured to receive data generated by the data-generating vehicles via vehicle sensors 404 of at least one of Vehicle 1 402, vehicle sensors 408 of Vehicle 2 406, and vehicle sensors 412 of Vehicle N 410. In some embodiments, the communication module 422 can also be configured to send data back to the data-generation vehicles. The communication module 422 could also submit (ping) a request to a specific vehicle computing system for additional information. In different embodiments, an onboard computing system (for example, onboard computing system 110 in FIG. 1) can facilitate or enable the transfer of data between the user vehicle 101 and driver alert system 420.

The data received by the driver alert system 420 can be evaluated by an image recognition system 424. The image recognition system 424 may be configured to identify drivers at a distance that may be traveling in a way that the driver may be impaired. Such image recognition system 424 may detect behavior such as driving erratically as in FIG. 2 or driving aggressively, such as by driving at an unsafe speed as in FIG. 3. For example, an object classification paradigm or machine vision techniques may be applied to a vehicle's data. The movement and other characteristics of potentially impaired drivers may be detected. Such characteristics may be used to determine the presence of an impaired driver, a type of an impaired driver, and a likely path for the impaired driver.

In some embodiments, the image recognition system 424 can access an impaired driver determination module 438 configured to assess the likelihood of the detected impaired driver as an impaired driver. The impaired driver determination module 438 can also determine whether the tracking data for the impaired driver ("impaired driver snapshot") can be used to produce a predicted path for this impaired driver. Such an impaired driver determination module 438 includes a model, used to identify characteristics of vehicle movement that indicate that a vehicle's movement may be characteristic of an impaired driver's vehicle 180. Such a model may be trained using machine learning techniques such as supervised learning, unsupervised learning, or reinforcement learning. For example, information about impaired drivers may be aggregated and used to train a learning model, such as a neural network or another type of model. The learning model can then associate new data with predicted paths.

For example, different types of impairment and accidents are discussed further, above. The model includes information about how to detect these types of impairment from images and other sensor data. The impaired driver determination module 438 may also be able to use information about the impaired driver's vehicle 180 to guess what sort of impairment may be affecting the impaired driver. If an impaired driver's vehicle 180 moves as shown in FIG. 3, for example, the impaired driver determination module 438 may detect that that an impaired driver may be aggressive. Such a determination infers aggression due to the high speed passing performed by impaired driver's vehicle 180.

The driver alert system 420 may detect impaired driving in several ways. In general, the driver alert system 420 gathers information from a number of information sources. The information sources generally include photographs and videos taken by cameras. The information may also include information gathered from other sensors. Such cameras and sensors may be resident at least in user vehicle 101. Cameras and sensors may also be present in other vehicles proximate to the user vehicle 101 and the impaired driver's vehicle 180. In general, modeling impaired driving takes place by crowdsourcing the gathering of information about how a potentially impaired driver drives. For example, the driver alert system 420 may aggregate driving information from a number of drivers in an area. The driver alert system 420 may also derive information from other sensors resident in the area that gather information about the impaired driver. The driver alert system 420 can then use the information to infer where the impaired driver may be directed. The driver alert system 420 can infer how to guarantee the safety of another driver accordingly.

It may also be possible, in another embodiment of a driver alert system 420, to infer aspects of a potentially impaired driver based only on information obtained by cameras and other sensors present at the user vehicle 101. The driver alert system 420 may process the images acquired from cameras. These images may include images obtained by a detecting user vehicle 101 and images obtained by other vehicles. The driver alert system 420 may use machine vision to detect the position and movement of a potential impaired driver's vehicle 180 as it changes over time.

Machine vision may also provide additional information. For example, machine vision may help establish information such as a make or model of the vehicle. Machine vision may also allow for recognizing of a license plate. License plate information may allow for identification of an impaired driver. Identifying the impaired driver may help identify the nature of the impairment. For example, if the impaired driver has a known history of epilepsy, it may be possible to infer that the impaired driver's driving may be due to a seizure. However, even if an impaired driver may be identified, it may not be possible to access information about health history due to privacy controls.

In a next step, the classified impaired driver's information can be shared with an impaired driver path predictive module 426. The impaired driver path predictive module 426 may be configured to determine the most likely or probable path, shown as impaired driver predicted path 428, of the target impaired driver's vehicle 180. Such an impaired driver predicted path 428 is the predicted path the impaired driver's vehicle 180 will be moving along for a future time window or path distance. The accuracy of the prediction generally decreases as the time window size or path distance increases.

In some embodiments, the impaired driver path predictive module 426 receives information collected by data-generating vehicles and shared with the impaired driver path predictive module 426 via communication module 422. The impaired driver path predictive module 426 uses such information to determine the most likely path or trajectory of the impaired driver's vehicle 180. For example, such information may include an average or most recent speed, acceleration, size, type, last (most recent) direction, and so on of the impaired driver's vehicle 180. The position information and type of impairment can be used by the impaired driver path predictive module 426 to determine the impaired driver predicted path 428. Such information may be aggregated and processed. The information may then be used with appropriate analytic techniques that extrapolate and predict the future motion of the impaired driver's vehicle 180 from the available data.

Some embodiments may include provisions for predicting the behavior of an impaired driver. In some cases, predicting the behavior includes considering an impaired driver's movements and an associated type of impairment. In some embodiments, such prediction may include anticipating how the position of an impaired driver will change over time. However, the behavior of an impaired driver may be inherently uncertain. In some cases, the prediction may include predicting one or more upcoming positions of an impaired driver. In some embodiments, the prediction may include a predicted position after certain time intervals. Such prediction could include a best guess after 30 seconds, one minute, two minutes, and so on.

In some embodiments, the prediction of the behavior may include predictions of turns and predictions of speed. In some cases, the predictions may include predictions of turns, which could include a direction of turn and a sharpness of the turns. In some cases, the predictions may include predictions of speed. In some embodiments, the predictions could include a prediction of changes of speed over time and predictions of acceleration and predictions of braking. In some cases, the prediction may include establishing cones of certainty that associate vehicles of impaired drivers with levels of probability and predicted future movements. In some embodiments, there may be multiple cones of certainty that associates the vehicle path with different probability ranges. In some cases, there may be a single cone of certainty that associates the vehicle path with a certain probability.

In some embodiments, the prediction may a specific predicted trajectory associated with a highest probability. Such a trajectory includes the movement and speed predicted based on current information about an impaired driver's motion and other information that allows for guessing where the impaired driver may be likely to be next. In some cases, such additional information may be information from other vehicles that extrapolates a current trajectory. In some cases, the impaired driver's vehicle may itself provide information about where it may be likely to go next. In some cases, the system may provide a specific prediction the impaired driver's vehicle may be likely to go next.

The driver alert system 420 may allow users that would potentially be endangered by the driving of an impaired driver to receive information about the driving of the impaired driver and to take responsive actions. For example, such information may include information about an impaired driver's expected route and driving actions. The information may also include information about a cone of certainty. The system establishes responsive actions based on a hazard level associated with an expected path of the user vehicle 101 with relation to the expected path of the impaired driver's vehicle 180. Such information may be provided to a user to help them avoid a dangerous interaction with the impaired driver. For example, such information may be provided using a head-up display. The information may include information about an identity of an impaired driver. The information may also include predicted dangerous driving information. Additional aspects of presenting such information are presented in the discussion of FIGS. 6-8 and 11.

In some embodiments, the cone of certainty associated with the impaired driver's predicted path 428 can be based on the amount or robustness of the data received from data-generating vehicles. For example, robust or high-quality data or larger sets of data about an object can allow for the system to project a future path or at least one cone of certainty that extends farther out in time or distance, such as by including less deviation. In another embodiment, there may be a minimum predicted path length or window of time for which the prediction extends that may be pre-determined by the system 320 or configured or selected by drivers.

The resultant impaired driver's predicted path 428 can be received by an impaired driver database 430 for temporary or permanent storage. Such storage may allow comparison with or updates to previously generated predicted paths for the same object. Such storage may also allow usage as a reference for subsequently generated predicted paths for the same object (i.e., for updates). As an example, if data about an impaired driver's vehicle 180 may be received from Vehicle 1 402 at a first time, a first predicted path can be generated and stored in the impaired driver database 430. If data about the same impaired driver is received from Vehicle 2 406 at a subsequent second time, the predicted path stored in the database for this object can be updated, supplemented, and replaced.

The impaired driver's predicted path 428 (or an updated version of the impaired driver's predicted path 428) will also be received by an intersection event determination module 432. The intersection event determination module 432 may be configured to determine whether the impaired driver's predicted path 428 may be likely to disrupt or otherwise be present on a portion of a roadway system where other vehicles registered with the data management system 400 may also be expected or projected to travel. These vehicles can share their routing information with driver alert system 420.

In some embodiments, a user vehicle 101 may include a vehicle tracking module 460. The vehicle tracking module 460 can provide information such as a current location 462, a current speed 464, and a current travel route 466 of the user vehicle 101 to the driver alert system 420. The intersection event determination module 432 can evaluate the two paths (those of the impaired driver and those of the user driver 102). The intersection event determination module 432 tracks the expected position of the user vehicle 101 relative to the expected position of the potential impaired driver's vehicle 180. Such tracking occurs with respect to a period of time. If at any point during the period of time, the two drivers may be likely to overlap or may be expected to be proximate (for example, within 5 to 10 meters or less, as a non-limiting example) to one another as the vehicle continues on its journey, a potential intersection event may be identified. For example, a user vehicle 101 may be expected to be proximate if it may be likely to travel through a cone of certainty of the impaired driver's vehicle 180.

Figure 6:
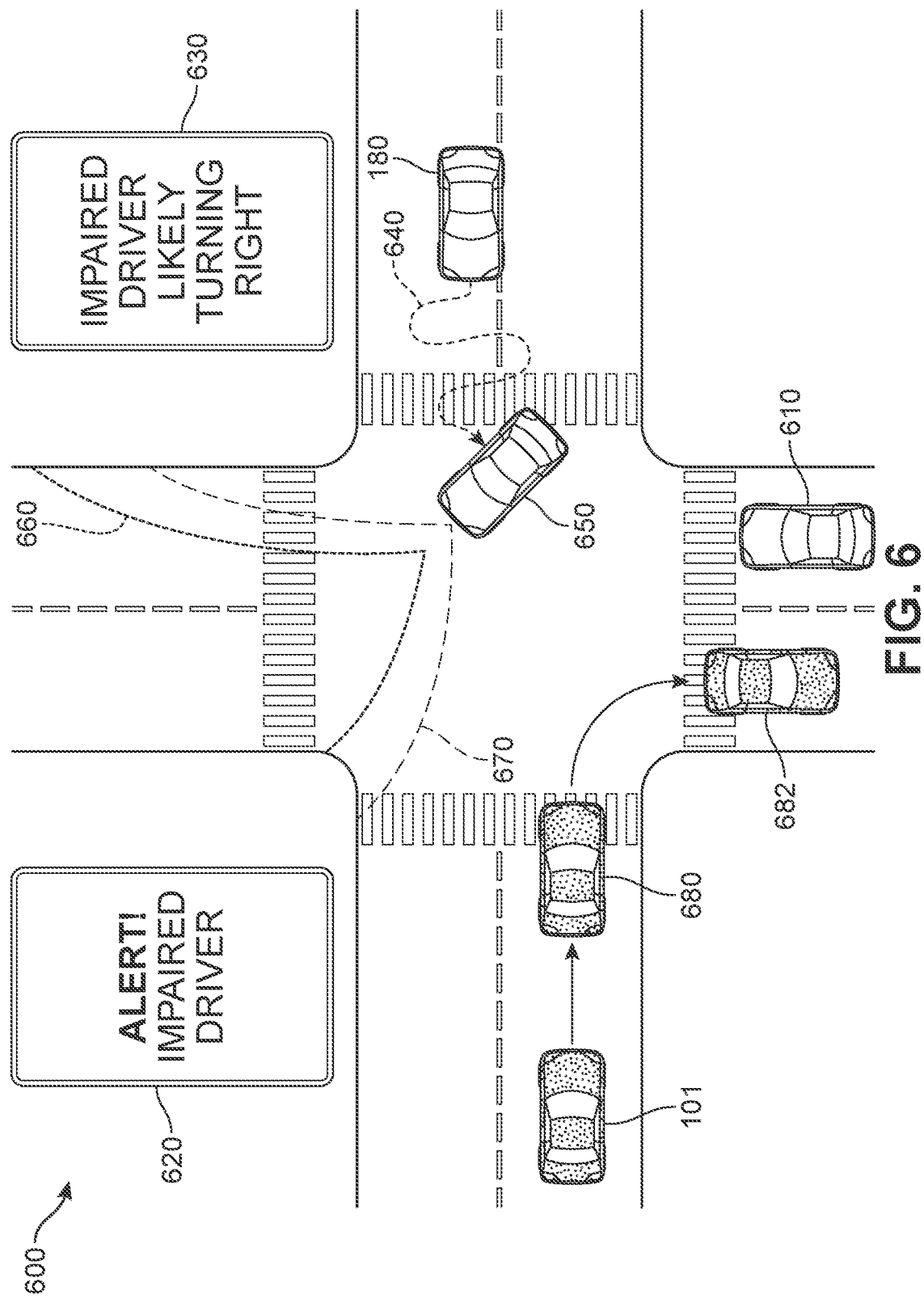
FIG. 6 is a schematic view of providing information to a vehicle when a vehicle may be in minimal danger from an impaired driver's vehicle, according to an embodiment.
Figure 7:
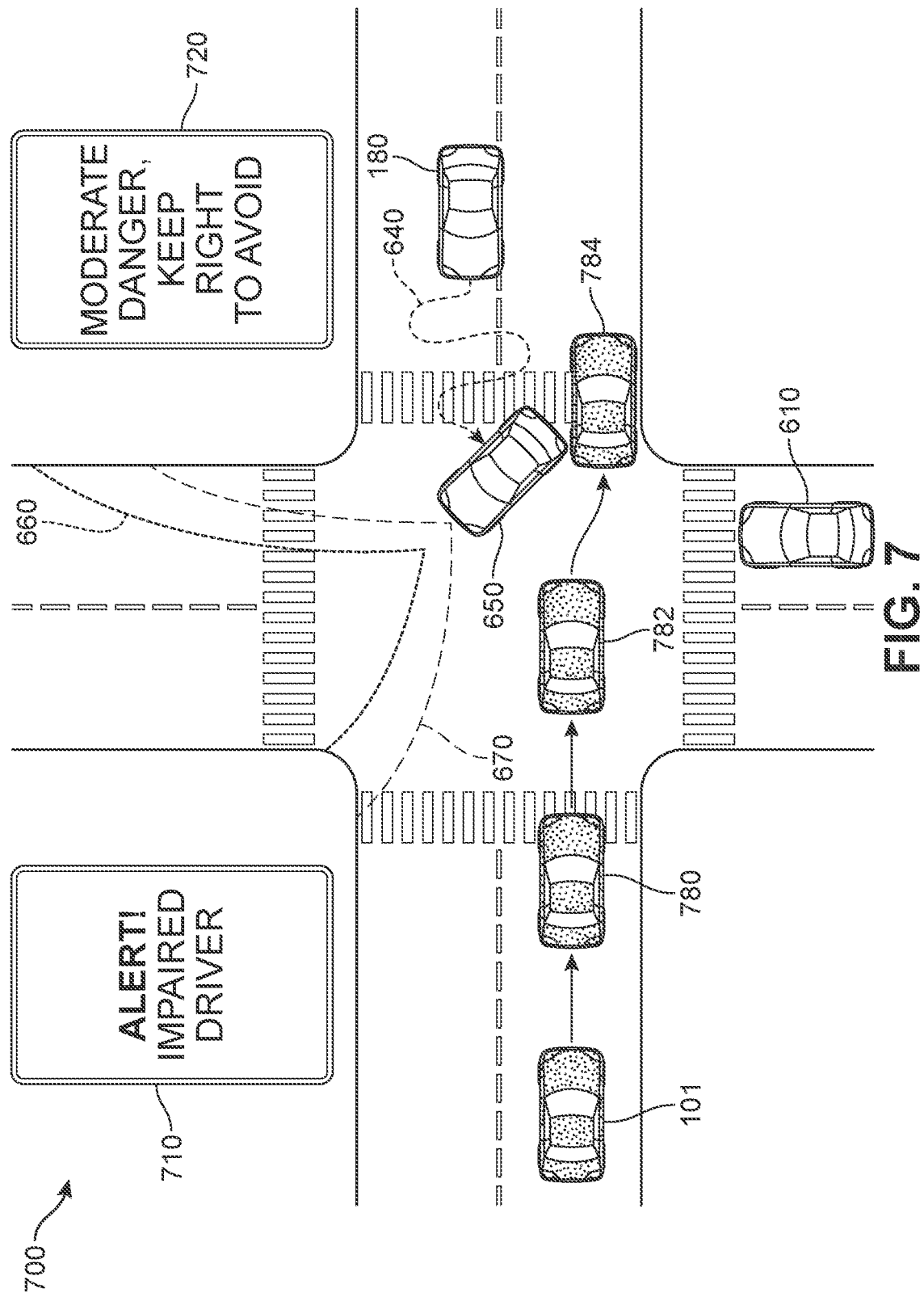
FIG. 7 is a schematic view of providing directions to a vehicle when a vehicle may be in moderate danger from an impaired driver's vehicle, according to an embodiment.
Figure 8:
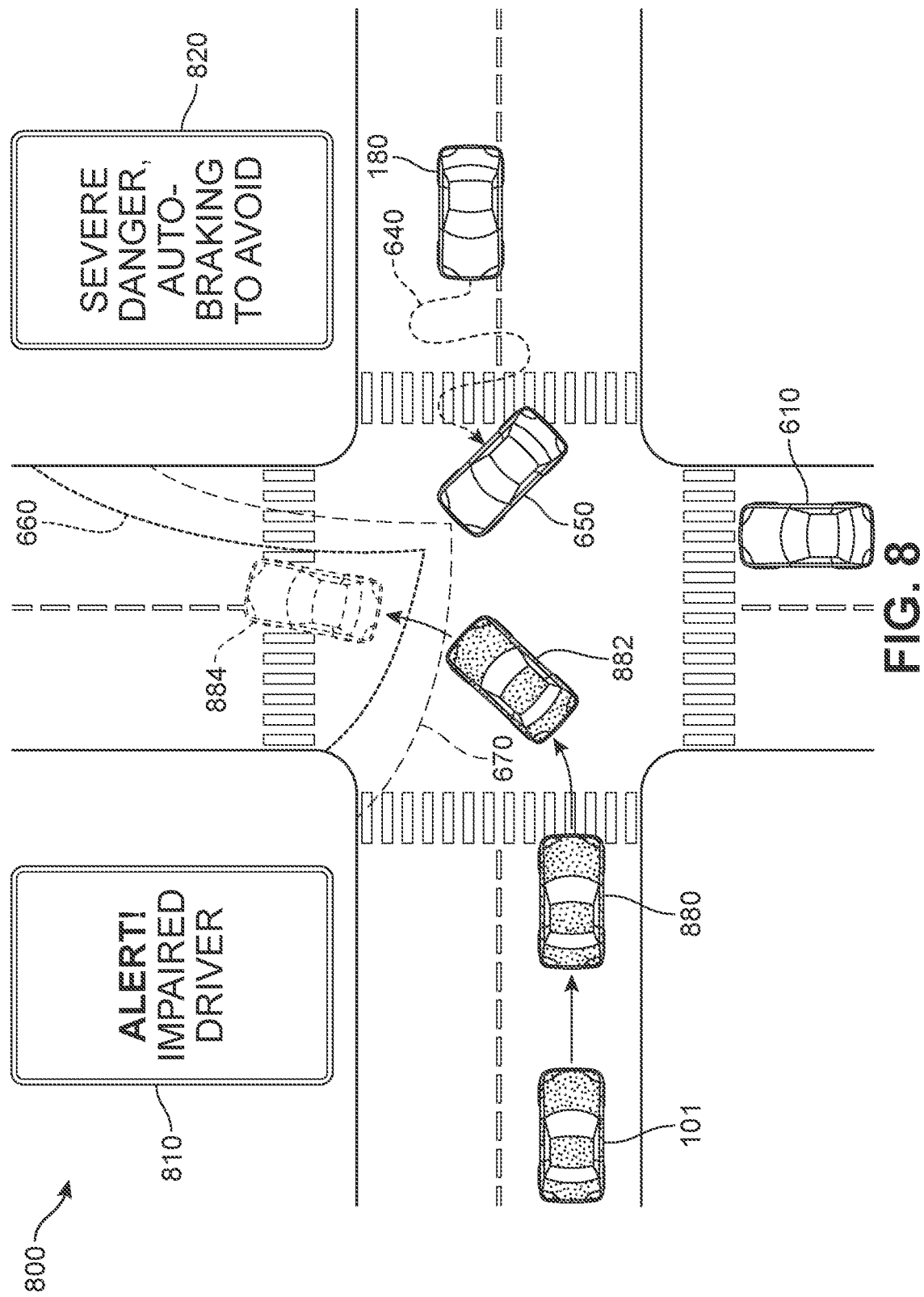
FIG. 8 is a schematic view of controlling a vehicle when a vehicle may be in urgent danger from an impaired driver's vehicle, according to an embodiment.

Thus, intersection event determination module 432 may be able to establish and measure a likelihood of a vehicle intersection event. Such a vehicle intersection event may involve various types of collision or other physical contact between the user vehicle 101 and the impaired driver's vehicle 180. The likelihood may be determined in a number of ways, such as by comparing locations, predicted paths, planned routes, cones of certainty, and so on. Such information may be provided to a model that associates probabilities with where the vehicles are likely to be over a period of time. Examples of this modeling are illustrated in FIG. 6-8. The modeling determines how likely the positions of the vehicles are to coincide as they change over time. The intersection event determination module 432 may identify a hazardous location at which a vehicle intersection event is likely to occur.

Once the modeling is complete, its results can be expressed in a number of ways. For example, the likelihood could be expressed qualitatively, such as high or low, or high, medium or low. The likelihood could be expressed in these ways by comparing it to a threshold. The likelihood could also be measured quantitatively, such as with a probability, a percentage, or another numerical score. The information used to predict a likelihood of collision may also be used to predict a severity of the collision. A higher likelihood of collision generally leads to an increased estimated severity. The type of predicted collision may also lead to an increased estimated severity. For example, a head-on collision is likely to be more severe than a read-end collision. The modeling may also assess a severity of a collision.

Furthermore, as discussed further with respect to FIGS. 6-8, the intersection event determination module 432 may identify regions (cones of certainty, as mentioned above) with differing probabilities of having the impaired driver's vehicle 180 be within the region. The identification of an intersection event between the impaired driver and another vehicle can trigger an alert generation module 434. The alert generation module 434 causes an alert to be presented to the driver via a display device 452 of the user vehicle 101. In some embodiments, the identification of an intersection event can also or alternatively trigger an alternate route generation module 436. The alternate route generation module 436 can present a guidance to reroute the driver along an alternate route. The alternate route may be a route that may be likely to avoid the target impaired driver. The alternate route generation module 436 may also automatically take over control of the user vehicle 101 to avoid the target impaired driver's vehicle 180, such as by automatically steering, automatically accelerating, or automatically braking.

It may be understood that in some embodiments, the user vehicle 101 can also include its own sensors. The user vehicle 101 may have the ability to provide data about conditions related to the movement of the impaired driver's vehicle 180 to driver alert system 420 for the benefit of other vehicles on nearby roadways. Similarly, one or more of the data-generating vehicles can also be recipients of the data provided by other data-generating vehicles. Thus, each vehicle that participates in the system may be potentially considered as a user vehicle 101. Each vehicle may be able to consider the movement of impaired driver's vehicle 180. Each vehicle may thus crowdsource information about how to avoid danger from impaired driver's vehicle 180.

The driver alert system 420 in FIG. 4 is shown as being outside of or external relative to the vehicles. However, it may be understood that in different embodiments, the driver alert system 420 or components of the driver alert system 420 can be located in each of the vehicles themselves. The vehicles may communicate directly via a vehicle-to-vehicle network. For example, the vehicles may communicate via a cellular network. Such communication may be represented by concentric "wireless" symbols in the drawings in FIG. 4, indicating communication between Vehicle 1 402, Vehicle 2 406, Vehicle N 410, and user vehicle 101. In another embodiment, the driver alert system 420 or components of the driver alert system 420 can be accessed through a cloud network and stored on a cloud-based server.

In yet another embodiment, the components such as at least one of communication module 422, image recognition system 424, impaired driver path predictive module 426, impaired driver predicted path 428, and impaired driver detection module 438 can be associated with Vehicle 1 402. Impaired driver database 430 may be associated with a cloud computing service. At least one of intersection event determination module 432, alert generation module 434, and alternate route generation module 436 may be associated with user vehicle 101. In some other embodiments, all aspects and components of driver alert system 420 may be associated with user vehicle 101 and possibly other data-generating vehicles. Alerts may be triggered locally within the user vehicle 101. Also, alternate routes may be generated and implemented in concert with the user vehicle's own internal navigation system.

Additionally, the driver alert system 420 may suggest or enact preventative measures to manage or mitigate the effects of the impaired driving on other users' safety. For example, a user vehicle 101 near the impaired driver's vehicle 180 may be following routes that, if continued, would result in danger due to the impaired driving. Therefore, the driver alert system 420 may provide a user driver 102 of such a user vehicle 101 with a warning that indicates steps that the driver can take to avoid an accident.

The driver alert system 420 may also take control of a user vehicle 101. The driver alert system 420 may cause automatic braking, automatic steering, or automatic accelerating in ways that may be intended to avoid collisions or other accidents with the vehicles with the impaired drivers. Such countermeasures may be based on gathering multiple sources of information to infer where a vehicle with an impaired driver may be most likely to be in the future based on its past behavior. Systems can then assess a corresponding level of risk, and suggest or take corrective actions that will be mostly likely to keep a user vehicle 101 out of a path of the impaired driver's vehicle 180. Additional details of these countermeasures are presented, below, in the discussion of FIGS. 7-8.

Together, the methods and systems enable intelligent alerts to be presented to a user driver 102 of a user vehicle 101. Such alerts may be based on information about the current location of the impaired driver's vehicle 180. Such alerts may also be based on information about route characteristics that may be expected to affect the impaired driver's vehicle 180 as it continues forward on its journey. For example, vehicles in an area may have cameras and other onboard sensors (such as light detection and ranging (LIDAR), as a non-limiting example). The cameras and sensors can detect motion of impaired drivers' vehicles. The cameras and sensors can also detect the motion of other vehicles in an area. Additional aspects of using such cameras and sensors are presented in the discussion of FIG. 5, below, which details further aspects of cameras and sensors that vehicles in an area may possess and how the vehicles use such cameras and sensors. The nature of a driver's impairment may also affect the alerts.

FIG. 5 is a schematic view of a set of vehicle sensors 500, according to an embodiment. However, the sensors 500 shown in FIG. 5 may be examples. Other types of sensors may be used in addition to or in lieu of these examples. As noted above, vehicles participating in the data management system 400 can collect or generate data. Each vehicle may include all or some of the sensors 500 in FIG. 5. Alternatively, some vehicles may include other sensors not shown in FIG. 5. In some embodiments, this data can encompass information about the behavior of the impaired driver's vehicle 180 itself, referred to as impaired driver's vehicle information. Examples of vehicle feedback information include, but are not limited to: vehicle lane position, relative vehicle speed, adjacent vehicle proximity, and braking response. Such vehicle feedback information can characterize the behavior of a vehicle. Using such information may make it possible to establish if a given vehicle has an impaired driver. Once embodiments identify a vehicle as being an impaired driver's vehicle 180, the path can then be inferred.

In some embodiments, this vehicle feedback information may be used along with the data regarding external road conditions to determine the predicted path of an impaired driver's vehicle 180. Various information can be received from various sensors 500, as depicted in FIG. 5. These include, but are not limited to, internal cameras 510, external cameras 520, microphones 530, acceleration sensors 540 (for example, an acceleration pedal sensor), wheel speed sensors 550, brake pedal sensors 560, and steering angle sensors 570. Such internal cameras 510 and external cameras 520 generate imagery and video information that can be processed using machine vision to establish the placement and movement of vehicles in an area.

Sensors such as microphones 530, acceleration sensors 540 (for example, an acceleration pedal sensor), wheel speed sensors 550, brake pedal sensors 560, and steering angle sensors 570 may be most relevant when gathering information from the user vehicle 101 or the impaired driver's vehicle 180. These sensors can help provide useful information about where the user vehicle 101 and the impaired driver's vehicle 180 may be headed by providing specifics of driver and vehicle behavior. However, even if such sensors are placed in other vehicles, these sensors can provide information that may be useful for improving the accuracy of machine vision. Additionally, external road conditions (for example, adjacent vehicle proximity, dynamic objects) could be determined from at least one of a light detection and ranging system (LIDAR) 580 and radio detecting and ranging (RADAR) based sensors. Such sensors use at least one of lasers, radio signals, and pings to provide an alternative way of tracking the movement of the impaired driver's vehicle 180 and other vehicles in an area.

The driver alert system 420 assembles information from the sensors 500 of the various vehicles to identify an impaired driver's vehicle 180 and observe aspects of its motion. The driver alert system 420 then predicts future behavior of the impaired driver. As noted above, one effective way in which the driver alert system 420 can model the behavior of impaired drivers may be to establish cones of certainty, alternatively known as cones of danger. Such cones represent that the further an impaired driver proceeds from a known location, the more likely it may be that the impaired driver will drive unpredictably and deviate from a known path. The prediction may also consider a type of impairment.

As shown and discussed further by way of non-limiting example in FIGS. 6-8, such cones include multiple regions with differing probabilities. The probabilities reflect where the vehicles with impaired drivers may be likely to be in the near future. For example, a cone of certainty may be narrow when close to the front end of an impaired driver's vehicle 180. At this point, the impaired driver's vehicle 180 has had little opportunity to diverge from its path. As the cone extends from the impaired driver's vehicle 180, it broadens. There may be less certainty that the impaired driver's vehicle 180 will not diverge from a straight-line path. Moreover, there may be multiple concentric cones. Each cone may capture a successively more divergent path of the impaired driver's vehicle 180. Additionally, widths of the cones may be based on a degree or type of impairment. In an embodiment, if an impaired driver is slightly tired, the cones may be relatively narrow. Such a driver may not deviate from a path dramatically. However, in an embodiment where an impaired driver is severely intoxicated, the cones may be relatively wide. Such a driver may deviate from a path considerably due to the large degree of impairment and the associated uncertainty.

The driver alert system 420 can also determine whether, if the impaired driver's vehicle 180 follows a likely trajectory as designated by the cones of certainty, that the impaired driver's vehicle 180 may be likely to intersect with or come into close proximity to the user vehicle 101 during the upcoming drive. For example, such a determination may use the intersection event determination module 432. If such a predicted path intersection or proximity event occurs, it may be likely that an accident will occur due to the erratic driving of the impaired driver's vehicle 180.

Accordingly, the system can then present alerts to the user driver. Such alerts may include augmented reality (AR) projections (such as with a head-up display as discussed with respect to FIG. 11). The alerts may be presented at appropriate times to the user driver 102 as the user vehicle 101 approaches these projected intersection locations and enters or passes through cones of certainty. The system can also generate a new route to the user driver's destination. Such a new route may be a route that reduces the likelihood of an intersection between the vehicle and the potential impaired driver's vehicle 180. If the travel of the impaired driver's vehicle 180 deviates from the projected travel based on newly sensed information, the alerts can be updated accordingly, or the adjustments to the vehicle's route can be updated accordingly. Examples of considering such cones of certainty and acting accordingly are presented in greater detail with respect to FIGS. 6-8. The discussion of FIGS. 6-8 refers to a system. Such a system may correspond to the driver alert system 420 of FIG. 4.

FIG. 6 is a schematic view 600 of providing directions to a vehicle when a vehicle may be in minimal danger, according to an embodiment. FIG. 6 shows a user vehicle 101 that may be about to enter an intersection. Impaired driver's vehicle 180 may be traveling along a road. Impaired driver's vehicle 180 may also be approaching the intersection. FIG.

6 shows impaired driver's vehicle 180 as driving erratically. Impaired driver's vehicle 180 takes on weaving positions 640 in the lane, and crosses over the lane median. From this erratic behavior, the system infers that impaired driver's 180 has an impaired driver. After the weaving occurs, impaired driver's vehicle 180 assumes position 650. Position 650 is shown, by way of example, as having impaired driver's vehicle 180 be crossed over to partially be on the wrong side of the road.

The system may also be designed to infer a possible path of the impaired driver's vehicle 180. FIG. 6 shows that the impaired driver's vehicle 180 may be associated with a cone of certainty associated with a predicted path of the impaired driver's vehicle 180. Such a cone indicates a region that may be straight ahead or mostly straight ahead of the impaired driver's vehicle's 180 direction of travel. For example, the impaired driver's vehicle 180, as shown in FIG. 6, may be associated with two cones of certainty. Specifically, these cones include first cone of certainty 660 and second cone of certainty 670. Here, first cone of certainty 660 indicates a primary area ahead of the impaired driver's vehicle 180 where the impaired driver's vehicle 180 may be most likely to be subsequently. The second cone of certainty 670 indicates a secondary area ahead of the impaired driver's vehicle 180 where the impaired driver's vehicle 180 may be less likely to be subsequently. There may still be a significant chance that the impaired driver's vehicle 180 may pass through the area defined by the second cone of certainty 670.

As shown in the example of FIG. 6, the first cone of certainty 660 may be an area of a road bounded by a V-shaped cone. Such a cone represents that the path of impaired driver's vehicle 180 appears most likely to be a right turn from its current road into a perpendicular road. The first cone of certainty 660 shows an area that the impaired driver's vehicle 180 may be mostly likely to be in as it makes that right turn. The second cone of certainty 670 may be a larger area of a road, also bounded by a V-shaped cone. The second cone of certainty 670 may be designated by dashed lines surrounding the first cone of certainty 660. The second cone of certainty 670 indicates an area associated with a larger deviation from a predicted path of the impaired driver's vehicle 180. While FIG. 6 shows two cones of certainty, specifically first cone of certainty 660 and second cone of certainty 670, such an example is not to be taken as limiting. In other embodiments, more than two cones of certainty may be used, or only one cone of certainty may be used.

Furthermore, in other embodiments, the cones of certainty may be associated with other angles. For example, FIG. 6 shows that the first cone of certainty 660 has an angular measure of about 30°. The second cone of certainty 670 has an angular measure of about 45°. These cones of certainty reflect that the driving of an impaired driver may be erratic and unpredictable. The further the driver proceeds, the less certainty with respect to the estimation of the path. By representing the driving using a cone of certainty, it captures a way to manage such uncertainty. The cone indicates that earlier in the path, the impaired driver's vehicle 180 has only had limited time to deviate from an expected path. The further the impaired driver's vehicle 180 travels, the further it may potentially tend to deviate.

In addition to impaired driver's vehicle 180, FIG. 6 shows two other vehicles. For example, FIG. 6 shows user vehicle 101 and observer vehicle 610. In FIG. 6, user vehicle 101 proceeds along a road towards an intersection. Thus, user vehicle 101 reaches location 680. At this point the user driver 102 of user vehicle 101 may wish to determine how to proceed with respect to the intersection. In the example of FIG. 6, user vehicle 101 proceeds from location 680 to turn right at the intersection. The user vehicle 101 turns right onto a perpendicular street and continues to location 682. Accordingly, user vehicle 101 does not follow a path that overlaps with the first cone of certainty 660 or the second cone of certainty 670. The path of user vehicle 101 may also not be proximate to that of impaired driver's vehicle 180.

Thus, in the example of FIG. 6, the system does not have to notify user vehicle 101 of danger. The predicted path of user vehicle 101 may not be likely to intersect with that of the impaired driver's vehicle 180. Additionally, FIG. 6 shows observer vehicle 610. Such an observer vehicle 610 may gather information about the path of impaired driver's vehicle 180. Such information gathering is discussed further in the discussion of FIGS. 4-5. For example, observer vehicle 610 may correspond to Vehicle 1 402 of FIG. 4. While only one observer vehicle 610 is illustrated in FIG. 6, use of only one observer vehicle 610 may be understood to be a non-limiting example. Using images and sensor information from at least one observer vehicle 610, it becomes possible to gather enough information to establish that a driver may be impaired. It also becomes possible to infer other information, such as the effect the impairment has on the impaired driver's driving. Such an inference may be advantageous. It may be helpful to make an accurate estimate of the path of the impaired driver's vehicle 180, which may be used for informative purposes and to take actions to avoid collisions or other accidents.

Accordingly, in the example of FIG. 6, it may remain safe if the user driver 102 of user vehicle 101 does not adjust his or her path. By turning right at the intersection, it may already be likely that the user vehicle 101 will avoid a collision without further course correction. Thus, a useful outcome of detecting the impaired driver's path would be simply to indicate to a user driver 102 of user vehicle 101 that an impaired driver may be nearby. For example, a display of a driver alert system 140 at user vehicle 101 may display "ALERT! IMPAIRED DRIVER" as a warning 620. There may not be an expected imminent danger of having user vehicle 101 enter first cone of certainty 660 or second cone of certainty 670, or pass in close proximity to these regions.

Thus, it may be sufficient to notify the user driver 102 of user vehicle 101 of the expected behavior of the impaired driver. For example, the driver alert system 140 at user vehicle 101 may prove a notification 630 such as "IMPAIRED DRIVER, LIKELY TURNING RIGHT." However, the notification 630 may also provide additional information, such as information about a type of impairment (e.g., intoxication, distracted driving, etc.), driving characteristics and types (e.g., erratic driving, high speed, low speed, reckless driving, etc.), and location information (e.g., correct lane, wrong lane, between lanes, in intersection, etc.). A type of impairment may also help predict the behavior of the impaired driver.

FIG. 7 is a schematic view 700 of providing directions to a vehicle when a vehicle may be in moderate danger, according to an embodiment. FIG. 7 is similar in various aspects to what is illustrated in FIG. 6. For example, FIG. 7 illustrates the same vehicles, specifically user vehicle 101, impaired driver's vehicle 180, and observer vehicle 610. Additionally, FIG. 7 also includes aspects of the impaired driving of impaired driver's vehicle 180. FIG. 7 shows weaving positions 640 by impaired driver's vehicle 180 as impaired driver's vehicle 180 assumes a position 650 at which it prepares to make a right turn. FIG. 7 also shows the first cone of certainty 660 and the second cone of certainty 670.

However, FIG. 7 illustrates a somewhat different scenario from that of FIG. 6. In FIG. 7, user vehicle 101 approaches the intersection, reaching location 780. Instead of turning right, as in FIG. 6, user vehicle 101 proceeds straight through the intersection. Thus, the route of user vehicle 101 passes through location 782. In the embodiment shown in FIG. 7, location 782 may be close to the second cone of certainty 670. For example, the system may determine that location 782 may be within a certain distance of second cone of certainty 670, for example 20 meters. However, 20 meters may be an arbitrary value. Different embodiments may utilize different distances as a threshold standard for proximity to a cone of certainty that may be considered as an indicator of danger.

As a result, the system infers that it may be best that the user vehicle 101 stay on the ride side of the lane along which it travels. By doing so, the user vehicle 101 avoids the proximate second cone of certainty 670 and makes it more likely that no accident will occur. For example, the display of a driver alert system 140 at user vehicle 101 may display "ALERT! IMPAIRED DRIVER" as a warning 710. There may be some danger of an accident if the user vehicle 101 continues along its course without modification. Thus, the display of the driver alert system 140 at user vehicle 101 may also display "MODERATE DANGER, KEEP RIGHT TO AVOID" as a warning 720. The warning 720 includes an indication that moderate danger may be relevant. Such moderate danger is detected due to the determined proximity between the projected path of user vehicle 101 and the second cone of certainty 670. The warning 720 also includes a specific suggestion as to how to avoid a potential accident.

In the example of FIG. 7, the warning 720 may only be presented as a suggestion, and implementing the warning 720 may be up to the user driver 102 of user vehicle 101. Also, the warning 720 represents only one way to avoid an accident. It can be seen that the user driver 102 of user vehicle 101 may hug the right side of the lane and proceed to position 784. Such an action may avoid an accident. However, it may also be possible to avoid the accident by changing speed or taking other avoidant actions. At the same time, it may be important for the user driver 102 of user vehicle 101 to take care. If the modifications to his or position are not carried out carefully, the chances of collision may actually be exacerbated. For example, a user driver 102 may attempt to slow down to avoid a collision. Such a slowdown may actually result in having the user vehicle 101 enter into the first cone of certainty 660, or another cone of certainty associated with greater urgency. This situation may provide another urgent warning, possibly different than an urgent warning previously presented, or an active intervention as in FIG. 8.

FIG. 8 is a schematic view 800 of providing directions to a vehicle when a vehicle may be in urgent danger, according to an embodiment. FIG. 8 is similar in various aspects to what is illustrated in FIG. 6. For example, FIG. 8 illustrates the same vehicles, specifically user vehicle 101, impaired driver's vehicle 180, and observer vehicle 610. Additionally, FIG. 8 also includes aspects of the impaired driving of impaired driver's vehicle 180. FIG. 8 shows weaving positions 640 by impaired driver's vehicle 180 as impaired driver's vehicle 180 assumes a position 650 at which it prepares to make a right turn. FIG. 8 also shows the first cone of certainty 660 and the second cone of certainty 670.

However, FIG. 8 illustrates a somewhat different scenario from that of FIGS. 6 and 7. In FIG. 8, user vehicle 101 approaches the intersection, reaching location 880. Instead of turning right, as in FIG. 6, or proceeding straight, as in FIG. 7, user vehicle 101 attempts to turn left at the intersection. Thus, the route of user vehicle 101 passes through location 882, enroute to a projected location 884. However, location 884 crosses through part of the first cone of certainty 660, and also the second cone of certainty 670.

As a result, the system infers that it may be desirable that the user vehicle 101 stop before making the left turn. The user vehicle 101 can thus avoid the first cone of certainty 660. Avoiding the first cone of certainty 660 may make it more likely that no accident will occur. For example, the display of a driver alert system 140 at user vehicle 101 may display "ALERT! IMPAIRED DRIVER" as a warning 810. There may be a significant danger of an accident if the user vehicle 101 continues along its course without modification. Thus, user vehicle 101 may perform automatic braking to stop at location 882. User vehicle 101 does not then proceed to location 884. The display of a driver alert system 140 at user vehicle 101 may also display "SEVERE DANGER, AUTO-BRAKING TO AVOID" as a warning 820.

Thus, the warning 820 includes an indication that severe danger may be relevant, due to the coincidence between the projected path of user vehicle 101 and the first cone of certainty 660. The warning 820 may also include a specific indication as to how action may be automatically taken to avoid a potential accident. In the example of FIG. 8, the warning 820 may be presented merely to inform the user driver 102 what may be going on. The user driver 102 is not expected to take action. Implementing the warning 820 may occur automatically. There may be a high likelihood of a severe accident. There may also be a high likelihood that such an accident would occur without immediate intervention. Hence, it may be helpful that automatic action may be taken by user vehicle 101 such as by navigation system 106.

Also, the automatic braking corresponding to warning 820 represents only one way to avoid an accident. At the same time, it may be helpful for the user driver 102 of user vehicle 101 to be cautious. If the modifications to a position of the user vehicle 101 are not carried out carefully, the chances of collision may actually be exacerbated. For example, a user driver 102 may attempt to slow down to avoid a collision. Such a slowdown may actually result in having the user vehicle 101 enter into the first cone of certainty 660, or another cone of certainty associated with greater urgency than an original urgency. In such a situation, the system may provide another urgent warning, possibly different than an urgent warning previously presented, or another automatic intervention as in the example of FIG. 8.

Figure 9:
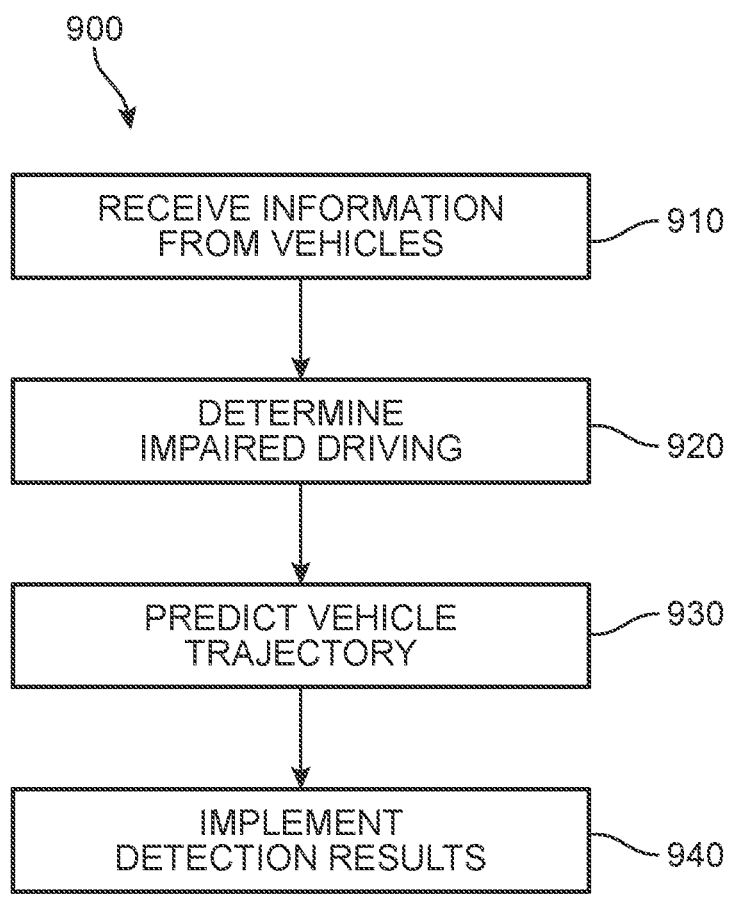
FIG. 9 is a flowchart depicting a process of detecting an impaired driver and taking appropriate action based on detecting the impaired driver, according to an embodiment.

FIG. 9 is a flowchart depicting a process 900 of detecting an impaired driver and taking appropriate action based on detecting the impaired driver, according to an embodiment. In a first step 910, the method 900 includes receiving information from vehicles. For example, such receiving is shown in parts of FIG. 4. The received information may include information from cameras and other sensors. For example, some of the information may be received from sensors of the user vehicle 101 and other vehicles in an area. Optionally, the information may include receiving information from the impaired user's vehicle itself. Such information may be omitted in another embodiment.

In a second step 920, the method 900 includes determining impaired driving. Such determining is also shown in parts of FIG. 4. The determining involves acquiring the information received about the movements of vehicles in an area. Once the movement is acquired, it is processed using models to establish which vehicles move in an unusual way that indicates that they have an impaired driver. In a third step 930, the method 900 includes predicting vehicle trajectory for the impaired driver. Such prediction is also shown in parts of FIG. 4. The prediction involves considering known information about how an impaired driver's vehicle 180 may be moving. The prediction uses such information to infer where the impaired driver's vehicle 180 may be likely to be as it progresses. The prediction may infer a cone of certainty. The prediction may also consider a determined type of impairment. In a fourth step 940, the method 900 includes implementing detection results. Such determining is also shown in parts of FIG. 4. The implementing involves taking action based on detecting the impaired driver. The implementing also involves predicting a corresponding trajectory, such as by providing an alert or otherwise assisting in avoiding an accident.

Figure 10:
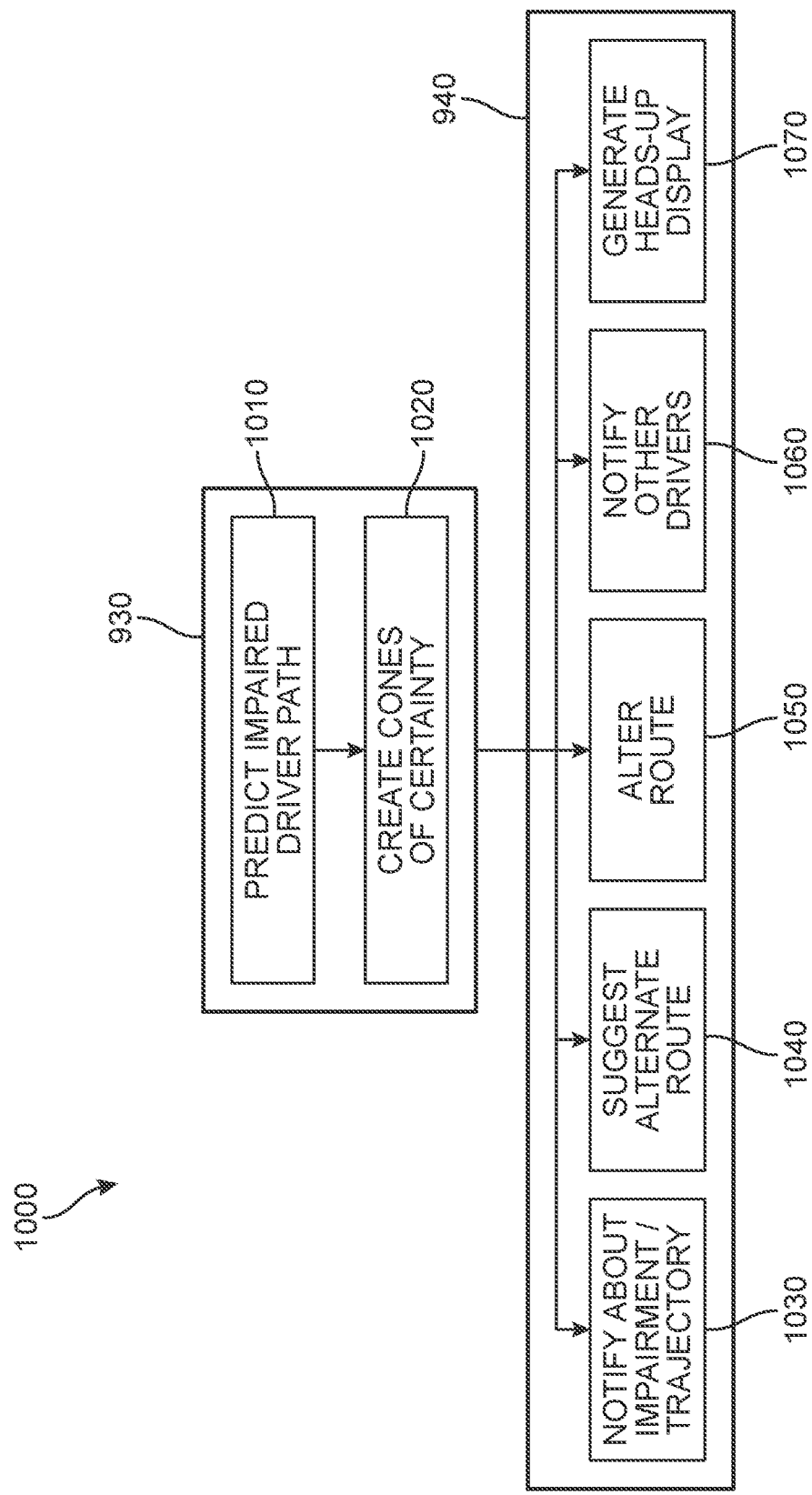
FIG. 10 is a flowchart depicting greater details of a process of detecting an impaired driver and taking appropriate action based on detecting the impaired driver, according to an embodiment.

FIG. 10 is a flowchart 1000 depicting greater details of a process of detecting an impaired driver and taking appropriate action based on detecting the impaired driver, according to an embodiment. Specifically, FIG. 10 shows details of sub-steps involved in step 930 of predicting vehicle trajectory for the impaired driver and sub-steps involved in step 940 of implementing detection results. Aspects of predicting vehicle trajectory in step 930 involve modeling the behavior of the impaired driver and inferring future with a model. Step 940 involves a series of steps for acting based on the detected behavior of the impaired driver.

Some embodiments may include provisions for taking responsive actions once an impaired driver is identified. In some embodiments, these responsive actions may also be based on predictions about the actions of the impaired driver. In some cases, the responsive actions include informing a user about behavior of an impaired driver. In some cases, the responsive actions include actions that direct a current vehicle based on the driving of an impaired driver. In some embodiments, informing a user about an impaired driver may include informing a user of a current vehicle that determines that another driver may be an impaired driver. In some cases, the informing may include informing another user in the local environment that another driver may be an impaired driver. In some embodiments, informing a user of a current vehicle may include summarizing or generally describing a path of an impaired driver.

In some cases, summarizing a path of an impaired driver may include providing at least one cone of certainty that characterizes the expected path of the impaired driver. In some embodiments, the system provides a predicted action to be taken by the impaired driver. In some cases, a predicted action may include a turn to be taken by the impaired driver or a speed associated with the impaired driver. In some embodiments, the system may provide a specific predicted route associated with the impaired driver. In some embodiments, the system may provide information to another user by providing a predicted route of another user, by providing a warning of a potential collision or accident, or by providing a suggested action that may avoid such a potential collision or accident.

In some embodiments, the system may take responsive actions by directing a current vehicle to react to the motion of the impaired driver. In some cases, the responsive actions include providing a suggestion to the driver of the current vehicle. In other cases, the responsive actions include automatically controlling a vehicle to avoid an accident. In some embodiments, the suggested responsive actions provided to the driver include accelerating, braking, turning, or suggesting a particular route or combination of actions. In some embodiments, the automatic responsive actions include accelerating, braking, turning, or a particular route or combination of actions, and the vehicle conducts these actions automatically to avoid an accident.

FIG. 10 subdivides step 930 into a first step 1010 of predicting an impaired driver's path and a second step 1020 of creating cones of certainty. In the first step 1010 of step 930, the system uses the gathered information about the pathway of the impaired driver to infer a best guess of the path of impaired driver's vehicle 180. In general, such a path will involve having the impaired driver's vehicle 180 continue along its current route. However, it may also be able to predict other paths to be followed by impaired driver's vehicle 180. For example, the system may be able to infer that the impaired driver's vehicle 180 may be turning or changing lanes.

In second step 1020 of step 930, the cones of certainty provide guidance about regions in which the vehicle's path may fall. As discussed above, there may be one cone of certainty, or multiple concentric cones of certainty. Each cone of certainty may capture different probabilities of where the impaired driver's vehicle 180 may be likely to travel. For example, there may be a first cone of certainty with an approximate measure of 30°. Such a cone may be associated with an estimated 50% probability that the impaired driver's vehicle 180 will be within the cone. There may be a second cone of certainty with an approximate measure of 45° associated with an estimated 75% probability that the impaired driver's vehicle 180 will be within the cone. However, these are only examples and other cone characteristics may be associated with the characteristics of different impaired drivers.

FIG. 10 shows sub-steps involved in step 940 of implementing detection results. For example, FIG. 10 subdivides step 940 into a first step 1030 of notifying about impairment and trajectory. Step 940 also includes a second step 1040 of suggesting an alternate route. Step 940 also includes a third step 1050 of altering a route. Step 940 also includes a fourth step 1060 of notifying other driver. Step 940 also includes a fifth step 1070 of generating a head-up display. It may be possible that more that more than one of these sub-steps may occur. Step 1030 involves providing visual, auditory, or other sensory feedback that notifies user driver 102 about the presence and conduct of impaired driver's vehicle 180. Step 1040 involves determining that there may be a potential danger of an accident. Step 1040 also includes automatically suggesting an alternative route that avoids the path of impaired driver's vehicle 180 accordingly.

Step 1050 involves determining that there may be a potential danger of an accident. Step 1050 also involves automatically routing user vehicle 101 to avoid the accident. Step 1060 involves notifying other drivers, such as by providing information about the path of impaired driver's vehicle 180. Such information may be possibly paired with information about the cones of certainty or suggested actions to avoid an accident. Step 1060 may also involve letting other drivers know what user vehicle 101 may be doing to avoid an accident so other drivers can act accordingly. Step 1070 involves presenting information from the other steps to user driver 102 using a head-up display, as shown in greater detail in FIG. 11.

FIG. 11 is an example of an interior view of a motor vehicle showing how information about an impaired driver may be provided to a driver of the motor vehicle. FIG. 11 shows the interior of a user vehicle 101 as in FIG. 1. FIG. 11 also shows a user driver 102. FIG. 11 shows that on windshield area 104, a head-up display displays information that allows user driver 102 to understand information about the impaired driver and the impaired driver's vehicle 180. A common type of head-up display, as illustrated in the drawings, includes a windshield area 104 equipped with features capable of displaying at least one of an image and text projected on the windshield area 104. The windshield area 104 may remain transparent or substantially transparent such that occupants of the vehicle can still clearly observe outside of the vehicle through the windshield area 104.

The display as shown in FIG. 11 includes the windshield area 104 in the front of the vehicle. However, other surfaces within the vehicle could be used for projection, including side windows or a rear window. Additionally, the view on the front windshield area 104 could be continued upon the front vehicle "A-pillars" and onto the side windows as a continuous image if desired and the vehicle is so configured. In some embodiments, an augmented reality (AR) display may be spatially overlaid on a head-up display for a driver of the vehicle. Thus, visual indicators or alerts as described may make use of any type of head-up display and AR display that may be available in the vehicle for presentation of alerts or notifications via the onboard computing system 110. However, the visual indicators may also be supplemented or replaced by appropriate audio alerts. Such audio alerts may include emitting a tone or audio signal. The audio alerts may also include an automated recitation of text presented visually. Such audio alerts may be presented through a speaker integrated into onboard computing system 110.

For example, windshield area 104 may display an impaired driver tag 1106, indicating "IMPAIRED DRIVER, ERRATIC PATH" to tag the impaired driver's vehicle 180. However, such an impaired driver tag 1106 may not be limited to merely identifying an impaired driver. The impaired driver tag 1106 can also provide other information. Such information may include a type of impairment or additional information about characteristics of how the driving may be impaired. The windshield area 104 can also provide a driving alert 1108. The driving alert 1108, as shown in FIG. 11, includes an icon that indicates that there may be an impaired sedan (a picture of a sedan), an alert icon (a picture of an exclamation point), a distance indicator (indicating an example proximity of 5 meters to a dangerous situation), and driving instructions (a turn indicator and a map showing how best to avoid the accident). Thus, such step-by-step information and routing instructions to the user driver 102 can be displayed on the head-up display. Such displaying helps user driver 102 understand how to driver user vehicle 101 to minimize the dangerous aspects of the impaired driver's vehicle 180.

As discussed, an initial aspect of embodiments may be gathering information from cameras and other sensors from vehicles in an area, including a user vehicle 101. The information may establish the impairment of an impaired driver's vehicle 180. Analysis of the specific behavior of such an impaired driver's vehicle 180 can permit better understanding of the specific impairment. The analysis may help predict routes of the impaired driver's vehicle 180 accordingly. For example, embodiments model such routes using cones of certainty that use probability to help understand where an impaired driver may be likely to travel. By selecting routes that avoid, or limit, exposing a user driver to dangerous routes taken by impaired drivers of vehicles, the system and method promote increased driving safety. This increase in safety helps reduce or eliminate situations that can lead a driver to be endangered by the inability of impaired drivers to drive in a safe manner.

The present system and methods therefore facilitate defensive driving. Such defensive driving enhances the ability of other drivers to predict the behavior of impaired drivers. Such prediction minimizes danger, both to the other drivers and also simultaneously to the impaired drivers. Embodiments use new ways to minimize such danger, such as by using new techniques to identify impaired drivers. Such techniques include crowdsourcing the gathering of observations of such impaired drivers. The techniques further include using trained models to classify such drivers as impaired. Embodiments may also be able to effectively model the behavior of impaired drivers. Embodiments may use cones of certainty. Embodiments may also find and implement effective interventions that preserve the safety of other vehicles that would otherwise be jeopardized by the impaired drivers.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, or any other suitable power source. A motor vehicle may further include wheels that may be powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of providing a driving route to a driver of a first vehicle, the method comprising:
    receiving information about a second vehicle from at least one sensor of the first vehicle;
    determining, based on the information, that a driver of the second vehicle is an impaired driver and a type of impairment of the driver of the second vehicle;
    determining, based on the information, a predicted path of the second vehicle;
    receiving a current location and a current route of the first vehicle;
    determining, based on the current location and the current route of the first vehicle and the predicted path of the second vehicle, a likelihood of a vehicle intersection event occurring between the first vehicle and the second vehicle at a hazardous location; and
    causing an alert to be presented to the driver of the first vehicle, the alert being based on the likelihood of the vehicle intersection event and containing a visual presentation to the driver of the first vehicle of information about a modified route that starts at the current location of the first vehicle and causes the first vehicle to avoid the hazardous location;
    wherein the visual presentation is shown on a windshield of the first vehicle in such a way that the windshield remains transparent when showing the visual presentation;
    wherein the visual presentation includes a map of the modified route, a distance indicator indicating a proximity to the hazardous location, and an impaired drive tag describing the type of impairment of the driver of the second vehicle.

2. The method of claim 1, wherein the information about the second vehicle comprises at least one photograph of the second vehicle taken using a camera of the first vehicle and the determining that the driver of the second vehicle is an impaired driver comprises detecting unsafe driving behaviors comprising at least one of an unsafe speed and unsafe steering by the driver of the second vehicle by performing machine vision on the at least one photograph of the second vehicle.

3. The method of claim 1, further comprising determining the likelihood of the vehicle intersection event using at least one cone of certainty associated with the current route of the first vehicle and at least one cone of certainty associated with the predicted path of the second vehicle.

4. The method of claim 3, wherein the modified route avoids the at least one cone of certainty of the second vehicle.

5. The method of claim 1, wherein the current route of the first vehicle corresponds to a current destination of the first vehicle and the modified route takes the first vehicle to the current destination while avoiding the hazardous location.

6. The method of claim 1, wherein the information about the second vehicle further comprises information from at least one sensor of at least one traffic network proximate to the first vehicle and the second vehicle; the at least one sensor being selected from a LIDAR sensor and a RADAR sensor.

7. The method of claim 1, wherein the information about the second vehicle further comprises information from at least one sensor of the second vehicle; the at least one sensor of the second vehicle including at least one of a microphone, a wheel speed sensor, a brake pedal sensor, and a steering angle sensor;

and wherein at least one of the information from the at least one sensor of the second vehicle and the information from the at least one sensor of the first vehicle includes data describing vehicle lane position, relative vehicle speed, adjacent vehicle proximity, and braking response of the second vehicle.

8. The method of claim 1, wherein the modified route is updated in response to a change in the predicted path of the second vehicle.

9. A method of providing a driving route to a driver of a first vehicle, the method comprising:
receiving information about a second vehicle from at least one sensor of the first vehicle;
determining, based on the information, that a driver of the second vehicle is an impaired driver and a type of impairment of the driver of the second vehicle;
determining, based on the information, a predicted path of the second vehicle;
receiving a current location and a current route of the first vehicle;
determining, based on the current location and the current route of the first vehicle and the predicted path of the second vehicle, a likelihood of a vehicle intersection event occurring between the first vehicle and the second vehicle at a hazardous location; and
causing an alert to be presented to the driver of the first vehicle, the alert being based on the likelihood of the vehicle intersection event and containing a visual presentation to the drive of the first vehicle of information about a modified route that starts at the current location of the first vehicle and causes the first vehicle to avoid the hazardous location, the modified route being presented to the driver of the first vehicle by changing a set of navigation instructions that a GPS provides to the driver of a first vehicle;
wherein the visual presentation is shown on a windshield of the first vehicle in such a way that the windshield remains transparent when showing the visual presentation;
wherein and the visual presentation includes a map of the modified route, a distance indicator indicating a proximity to the hazardous location, and an impaired drive tag describing the type of impairment of the driver of the second vehicle.

10. The method of claim 9, further comprising determining the likelihood of the vehicle intersection event using at least one cone of certainty associated with the current route of the first vehicle and at least one cone of certainty associated with the predicted path of the second vehicle.

11. The method of claim 10, wherein the modified route avoids the at least one cone of certainty of the second vehicle.

12. The method of claim 9, wherein the modified route is updated in response to a change in the predicted path of the second vehicle.

13. The method of claim 9, wherein the alert presented to the driver of the first vehicle further includes information describing a type of impairment associated with the impaired drive and additional information about characteristics of how the driving may be impaired.

14. The method of claim 9, wherein the alert presented to the driver of the first vehicle further includes a distance indicator, indicating a proximity to the hazardous location.

15. The method of claim 9, wherein the information about the second vehicle further comprises information from at least one sensor of at least one traffic network proximate to the first vehicle and the second vehicle; the at least one sensor being selected from a LIDAR sensor and a RADAR sensor.

16. The method of claim 9, wherein the information about the second vehicle further comprises information from at least one sensor of the second vehicle; the at least one sensor of the second vehicle including at least one of a microphone, a wheel speed sensor, a brake pedal sensor, and a steering angle sensor;
and wherein at least one of the information from the at least one sensor of the second vehicle and the information from the at least one sensor of the first vehicle includes data describing vehicle lane position, relative vehicle speed, adjacent vehicle proximity, and braking response of the second vehicle.

* * * * *